(12) United States Patent
Rhee

(10) Patent No.: US 6,421,387 B1
(45) Date of Patent: Jul. 16, 2002

(54) METHODS AND SYSTEMS FOR FORWARD ERROR CORRECTION BASED LOSS RECOVERY FOR INTERACTIVE VIDEO TRANSMISSION

(75) Inventor: Injong Rhee, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 216 days.

(21) Appl. No.: 09/635,614

(22) Filed: Aug. 10, 2000

Related U.S. Application Data

(63) Continuation-in-part of application No. 09/560,409, filed on Apr. 27, 2000, which is a continuation-in-part of application No. 09/079,621, filed on May 15, 1998, now Pat. No. 6,104,757.

(51) Int. Cl.[7] .............................................. H04B 1/66

(52) U.S. Cl. .......................... 375/240.27; 375/240.12; 715/18; 715/48

(58) Field of Search ........................... 375/240, 240.27, 375/240.12; 714/18, 48; H04N 7/64, 7/36

(56) References Cited

U.S. PATENT DOCUMENTS

| | | | | |
|---|---|---|---|---|
| 5,680,322 A | * | 10/1997 | Shinoda | 714/18 |
| 5,767,907 A | * | 6/1998 | Pearlstein | 348/407 X |
| 5,794,018 A | * | 8/1998 | Vrvilo et al. | 713/400 |
| 6,104,757 A | * | 8/2000 | Rhee | 375/240.12 |

OTHER PUBLICATIONS

Rhee et al., "FEC–Based Loss Recovery for Interactive Video Transmission," Proceedings of IEEE International Conference on Multimedia Computing and Systems, vol. 1, pp. 205–256, Florence, Italy, (Jun. 1999).

Rhee, "Error Conrtol Techniques for Interactive Low–Bit Rate Video Transmission Over the Internet," Proceeding of the ACM SIGCOMM '98, pp. 290–301, (Sep. 1998).

Rhee, "Retransmission–Based Error Control for Interactive Video Applications Over the Internet," Proceedings of the International Conferecne on Multimedia Computing and Systems, pp. 118–127, (Jun. 1998).

Talluri, "Error–Resilient Video Coding in ISO MPEG–4 Standard," IEEE Communication Magazine, vol. 36 (No. 6), pp. 112–119, (Jun. 1998).

(List continued on next page.)

Primary Examiner—Howard Britton
(74) Attorney, Agent, or Firm—Jenkins & Wilson, P.A.

(57) ABSTRACT

Real-time interactive video transmission in the current Internet has mediocre quality because of high packet loss rates. Loss of packets belonging to a video frame is evident not only in the reduced quality of that frame but also in the propagation of that distortion to successive frames. This error propagation problem is inherent in any motion-based video codec because of the interdependence of encoded video frames. Since packet losses in the best-effort Internet environment cannot be prevented, minimizing the impact of these packet losses to the final video quality is important. A new forward error correction (FEC) technique effectively alleviates error propagation in the transmission of interactive video. The technique is based on a recently developed error recovery scheme called Recovery from Error Spread using Continuous Updates (RESCU). RESCU allows transport level recovery techniques previously known to be infeasible for interactive video transmission applications to be successfully used in such applications. The FEC technique can be very useful when the feedback channel from the receiver is highly limited, or transmission delay is high. Both simulation and Internet experiments indicate that the FEC technique effectively alleviates the error spread problem and is able to sustain much better video quality than H.261 or other conventional FEC schemes under various packet loss rates.

36 Claims, 22 Drawing Sheets

Podolsky et al., "Stimulation of FEC–Based Error Control for Packet Audio on the Internet," Proceedings of the ACM SIGMETRIC/PERFORMANCE, pp. 505–515, (Jun. 1998).

Carle et al., "Survey of Error Recovery Techniques for IP–Based Audio–Visual Multicast Applications," IEEE Network, pp. 24–36, (Dec. 1997).

McCanne et al., "Low–Complexity Video Coding for Receiver4–Driven Layered Multicast," IEEE Journal on Selected Areas in Communcations, vol. 16 (No. 6), pp. 983–1001, (Aug. 1997).

MPEG97, "Description of Error Resilient Core Experiments," International Organization for Standardization, (Jul. 25, 1997).

Li et al., "Layered Video Multicast with Retransmission (LVMR): Evaluation of Error Recovery Schemes," Proceedings of the Sixth International Workshop on Network and Operating SystemSupport for Digital Audio and Video, pp. 1–5, (May 1997).

Xu et al., "Resilient Multicast Support for Continuos–Media Applications," Proceedings of the Sixth International Workshop on Network and Operating System Support for Digital Audio and Video, (May 1997).

Rizzo, "Effective Erasure Codes for Reliable Computer Communication Protocols," Computer Communcation Review, vol. 27 (No. 2), pp. 24–36, (Apr. 1997).

Ghanbari, "Postprocessing of Late Cells for Packet Video," IEEE Transactions on Circuits and Systems for Video Technology, Vel. 6 (No. 6), pp. 669–678, (Dec. 1996).

Albanese et al,. "Priority Encoding Transmission," IEEE Transactions on Information Theory, vol. 42 (No. 6), pp. 1737–1744, (Nov. 1996).

Yajnik et al., "Packet Loss Correlation in th Mbone Multicast Network," Proceeding of IEEE Globecom '96, (Nov. 1996).

Alon et al., "A Linear Time Erasure–Resilient Code with Nearly Optimal Recovery," IEEE Transactions on Information Theory, vol. 42 (No. 6), pp. 1732–1736, (Nov. 1996).

Papadopoulos et al., "Retrasmission–Based Error Control for Continuous Media Applications," Proceedings of the Sixth International Workshop on Network and Operating System Support for Digital Audio and Video, pp. 5–12, (Feb. 1996).

Liu et al., "Performance of Video Transport Over Wireless Networks Using Hybrid ARQ," Proceedings of IEEE International Conference on Universal Personal Communications (ICUPC), pp. 567–571, (Oct. 1996).

Bolot et al., "Adaptive Error Control for Packet Video in the Internet," Proceedings of International Conference on (Sep. 1996). Internet Protocol pp. 25–28,.

Amir et al., "A Layered DCT Coder for Internet Video," The Proceedings of IEEE International Conference on Image Processing, (Sep. 1996).

McCanne et al., "Receiver–Driven Layered Multicast," Proceedings of ACM SIGCOMM, pp. 117–130, (Aug. 1996).

Han et al., "Multi–Resolution Layered Coding for Real–Time Image Transmission: Architectural and Error Control Considerations," Academic Press, pp. 1–18, (Mar. 28, 1996).

Dempsey et al., "On Retransmission–Based Error Control for Continuous Media Traffic in Packet–Switching Networks," Computer Networks and ISDN Systems, pp. 1–24, (Feb. 1996).

Casner, et al., "RTP: A Transport Protocol for Real Time Applications," RCF 1889, (Jan. 1996).

McCanne et al., "vic: A Flexible Framework for Packet Video," Proceedings of ACM Multimedia '95, pp. 511–522, (Nov. 1995).

Luo et al., "Analysis of Error Concealment Schemes for

Biersack, "Performance Evaluation of Forward Error Correction in an ATM Environment," IEEE Journal on Selected Areas in Communications, vol. 11 (No. 4), pp. 631–640 (May 1993).

Bolot et al., "The Case for FEC–Based Error Control for Packet Audio in the Internet," ACM Multimedia Systems Journal, pp. 1–13.

Kallel et al., "Generalized Type II Hybrid ARQ Scheme Using Punctured Convolutional Coding," IEEE Transactions on Commucations, vol. 38 (No. 11), pp. 1938–1946, (Nov. 1990).

Mcauley, "Reliable Broadband Communication Using A Burst Erasure Correcting Code," Proceedings of the ACM SIGCOMM, pp. 297–306, (Sep. 1990).

Ghanbari, "Two–Layer Coding of Video Signals for VBR Networks," IEEE Journal on Selected Areas in Communciations, vol. 7 (No. 5), pp. 771–781, (Jun. 1989).

Hagenauer, "Rate–Compatible Punctured Convolutional Codes (RCPC Codes) and their Applications," IEEE Transactions on Communications, vol. 35 (No. 4), pp. 389–400, (Apr. 1988).

Nonnenmacher et al., "Parity–Based Loss Recovery for Reliable Mulicast Transmission," IEEE/ACM Transactions on Networking, pp. 349–361, (Aug. 1998).

Rubenstein et al., "Real–Time Reliable Multicast Using Proactive Forward Error Correction," IEEE NOSSDAV '98, pp. 1–15, Cambridge, United Kingdom, (Jul. 1998).

Wada, "Selective Recovery of Video Packet Loss Using Error Concealment," IEEE Journal on Selected Areas in Communications, vol. 7 (No. 5), pp. 807–814, (Jun. 1989).

* cited by examiner

METHODS AND SYSTEMS FOR FORWARD ERROR CORRECTION BASED LOSS RECOVERY FOR INTERACTIVE VIDEO TRANSMISSION

PRIORITY APPLICATION INFORMATION

This application is a continuation-in-part of commonly-assigned U.S. patent application Ser. No. 09/560,409, filed Apr. 27, 2000 and now pending, which is a continuation-in-part of commonly-assigned U.S. patent application Ser. No. 09/079,621, filed May 15, 1998 and now U.S. Pat. No. 6,104,757, the disclosures of each of which are incorporated herein by reference in their entirety.

RELATED ART

Transmitting high-quality, real-time interactive video over lossy networks, such as the Internet and wireless networks, is very challenging. Because of limited bandwidth on networks and the bandwidth-intensive nature of video, video transmission requires extremely high compression efficiency. However, state-of-the-art compression standards (MPEG, H.261) are not designed for transmission over a lossy channel. Although they can achieve very impressive compression efficiency, even small data losses can severely degrade video quality. A few bit errors in encoded data can cause the decoder to lose synchronization in the encoded stream and can render useless all the data received until the next synchronization point. Furthermore, motion estimation and compensation in these codecs pose an even more severe problem, namely, error propagation (or error spread). Motion estimation removes temporal redundancy in successive video frames (inter frames) by encoding only pixel value differences (prediction error) between a currently encoded image and a motion-predicted image created from a previously encoded image (reference frame). Image distortion in a reference frame can propagate to its succeeding frames and becomes amplified as more bits are lost.

Conventional work on loss recovery focuses on repairing packet losses before the scheduled display times of those video frames contained in lost packets. However, this approach is ineffective for interactive video because data losses inevitably occur in packet-switched communication, and detecting and repairing losses causes latency. To handle this latency, existing techniques introduce additional delays in frame display times. However, delaying frame playout times greatly impairs the interactiveness of video communication.

Many researchers have proposed using retransmission of lost packets by delaying frame playout times to allow arrival of retransmitted packets before the display times of the video frames associated with the packets. Any packet received after the display time of its associated video frame will be discarded. In these schemes, the display time of a frame is delayed by at least three one-way trip times after its initial transmission (two for frame transmission and one for a retransmission request). This latency can significantly impair the interactiveness of any video applications under the current Internet.

Forward error correction (FEC) is commonly proposed for error recovery of continuous media transmission. However, conventional FEC schemes do not work well for interactive video. The reason that conventional FEC schemes do not work well with interactive video is that unless the playout time of a frame is delayed, both the original packets and their parity or FEC packets must be transmitted within the same frame interval, rendering the schemes very susceptible to burst loss. Moreover, since FEC is applied to a block of packets, before FEC packets are computed and transmitted, a large delay can occur.

Commonly-assigned, co-pending U.S. patent application Ser. No. 09/079,621, filed May 15, 1998 now U.S. Pat. No. 6,104,757, and entitled "SYSTEM AND METHOD OF ERROR CONTROL FOR INTERACTIVE LOW-BIT RATE VIDEO TRANSMISSION" (hereinafter, "the RESCU Patent Application") discloses a complementary approach to the above-mentioned approaches by focusing on eliminating error propagation when distortion on displayed images occurs. This approach is referred to as recovery from error spread using continuous updates (RESCU). The point of departure from existing approaches described in the RESCU Patent Application is that packets do not have to arrive in time for them to be "useful" for display of that video frame. Of course, if packets can arrive before the display times of their frames, that is optimal. However, due to packet losses and high latency, repair packets inevitably arrive "late," causing distortion in displayed images, which can propagate to successive frames. These late repair packets can be used to stop error propagation. In motion-compensated codes, the correct display of a frame depends on the successful reception of all of its reference frames. If displayed frames are buffered and late packets are used to restore errors in the buffered frames, error propagation can be stopped. The reason that error propagation can be stopped is that the buffered frames will be used as reference frames for later frames.

RESCU has been shown to be effective for interactive video transmission when retransmission is used to recover lost packets and round trip delays are small. Retransmission tends to prolong error propagation because of the delay involved in detecting and retransmitting lost packets. Moreover, in some networks, such as wireless, cable modems, and direct satellites, feedback channels are highly contentious, and bandwidth-limited. Thus, in these networks, frequent transmission of feedback to the sender is too expensive. Accordingly, there exists a need for improved methods and systems for performing error recovery when transmitting compressed video over a lossy packet based network.

DISCLOSURE OF THE INVENTION

According to one aspect, the present invention includes a new FEC technique for interactive video that combines FEC with RESCU. By incorporating this FEC technique, RESCU can perform very effectively in an environment where little or no feedback is available, or transmission delay is too high for retransmission to be effective. The FEC scheme according to the present invention clearly differs from the conventional schemes in that FEC packets can be transmitted over a longer period than a single frame interval without introducing delay in frame playout times. Since RESCU uses FEC packets to restore buffered reference frames (referred to herein as periodic frames), FEC packets can be transmitted over a relatively longer period, interleaving with the packets of other (non-periodic) frames to help reduce the effect of bursty losses. This interleaving is different from link-level symbol interleaving where symbols from multiple codewords are interleaved. The granularity of interleaving according to the present invention is much larger and thus, more effective than link-level interleaving. Since RESCU makes non-periodic frames temporally depend only on the immediately preceding periodic frame and, unlike retransmission, FEC involves no feedback delay, the proposed technique incurs shorter recovery delays and accordingly shorter error propagation. Thus, the present invention can be effective for high frame rate transmission over lossy, high-latency networks.

Accordingly, it is an object of the present invention to provide improved methods and systems for reducing error spread in video transmission over a packet-based network.

Some of the objects of the invention having been stated above herein, other objects will become evident as the description proceeds when taken in connection with the accompanying drawings as best described herein below.

BRIEF DESCRIPTION OF THE DRAWINGS

Preferred embodiments of the present invention will now be explained with reference to the accompanying drawings of which.

DETAILED DESCRIPTION OF THE INVENTION

Figure 1:
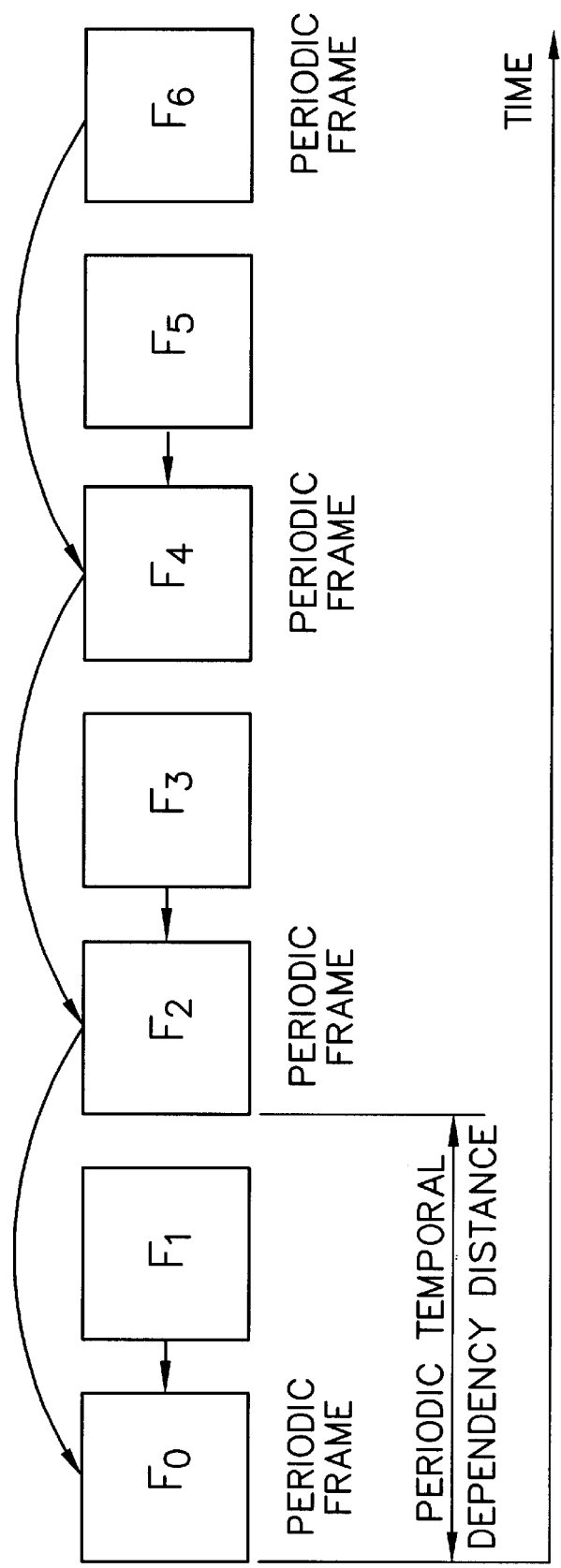
FIG. 1 is a block diagram illustrating periodic RESCU with a periodic temporal dependency distance (PTDD) of 2.

Before explaining error recovery using FEC and RESCU, RESCU will be explained in the context of H.261, an International Telecommunication Union (ITU) video standard. In H.261, a video sequence consists of two types of video frames: intra-frames (I-frames) and inter-frames (P-frames). I-frames remove only spatial redundancy present in the frame. P-frames are encoded through motion estimation using another P-frame or I-frame as a reference frame (R-frame). For each image block in a P-frame, motion estimation finds a closely matching block within its R-frame, and generates the displacement between the two matching blocks as a motion vector. The pixel value differences between the original P-frame and a motion-predicted image of the P-frame, which are obtained by simply cutting-and-pasting the matching image blocks from the R-frame, are encoded along with the motion vectors.

If any packet(s) belonging to a video frame are lost, not only is that frame shown with distortion, but the error also propagates to the succeeding frames until the next synchronization point (an I-frame). However, I-frames cannot be sent often since they require a large number of packets, which would unacceptably increase the bandwidth. In high-frame rate, real-time interactive video transmission using H.261, transport level recovery techniques, such as timeout and retransmission, cannot be effectively used without delaying playout times because of the network latencies involved in detecting and repairing lost packets. Such playout delay severely affects the interactiveness of video applications. Hence, in H.261 an I-frame needs to be sent to stop error propagation.

In RESCU, packets arriving after their display times are not discarded but instead used to reduce error propagation. In motion-compensation-based codecs, the correct image reconstruction of a currently displayed image depends on a successful reconstruction of its R-frames. By using the late packets to restore R-frames, errors due to lost packets can be prevented from spreading to following frames.

The deadline of a packet is defined herein to be the time by which the packet must arrive at the receiver to be useful. RESCU allows this deadline to be arbitrarily adjusted through the temporal dependency distance (TDD) of a frame which is defined herein to be the minimum number of frame intervals between that frame and its temporally dependent frame. By extending TDD, a frame can be arranged to be referenced much later than its display time. This adjustment effectively masks out the delay in repairing lost packets. For instance, every p-th frame (referred to as a periodic frame) can be made to reference the frame located p frame intervals away. This TDD of periodic frame is referred to herein as periodic TDD (PTDD). Every non-periodic frame (frames between two consecutive periodic frames) depends only on its immediately preceding periodic frame. Thus, the TDD of the non-periodic frames is between 1 and PTDD. Although a periodic frame may be displayed with error because of some losses of its packets, if these losses can be recovered within a PTDD period through a transport-level recovery mechanism, such as retransmission, the errors will stop propagating beyond the next periodic frame. Thus, the main benefit of the RESCU scheme is that it allows more time for a transport-level recovery mechanism to be successful. Also, errors in non-periodic frames do not propagate at all because all non-periodic frames temporally depend only on periodic frames. Extending TDD does not affect frame playout times because all frames are still displayed at their scheduled display times.

FIG. 1 illustrates the concepts of periodic frames, non-periodic frames, temporal dependency distance, and periodic temporal dependency distance. In FIG. 1, frames $F_0$–$F_6$ represent a series of video images to be transmitted from a sender to a receiver over a packet network and displayed by the receiver. Frame $F_0$ is the first-displayed frame and frame $F_6$ is the last-displayed frame. Frame $F_0$ is a periodic frame for frame $F_2$, frame $F_2$ is a periodic frame for frame $F_4$, and frame $F_4$ is a periodic frame for frame $F_6$. The PTDD between periodic frames in FIG. 1 is two frame periods. Frames $F_1$, $F_3$, and $F_5$ are non-periodic frames that refer back only to the nearest periodic frames. For example, in FIG. 1, frame $F_1$ depends only on frame $F_0$.

Figure 2:
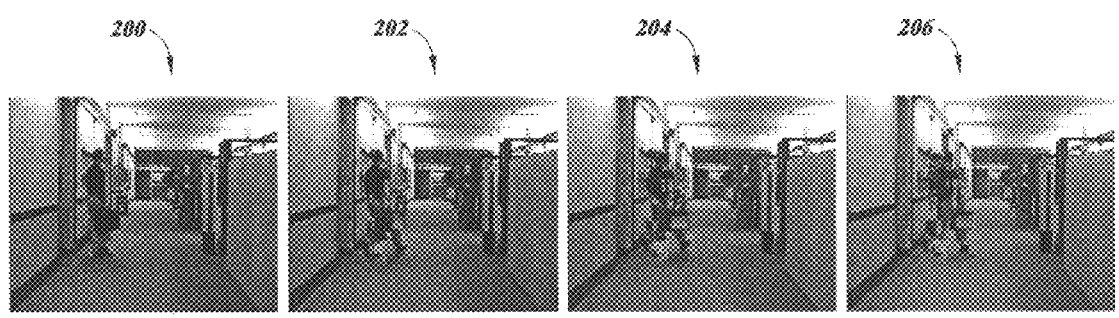
FIG. 2 is a sequence of video frames illustrating error propagation.
Figure 3:
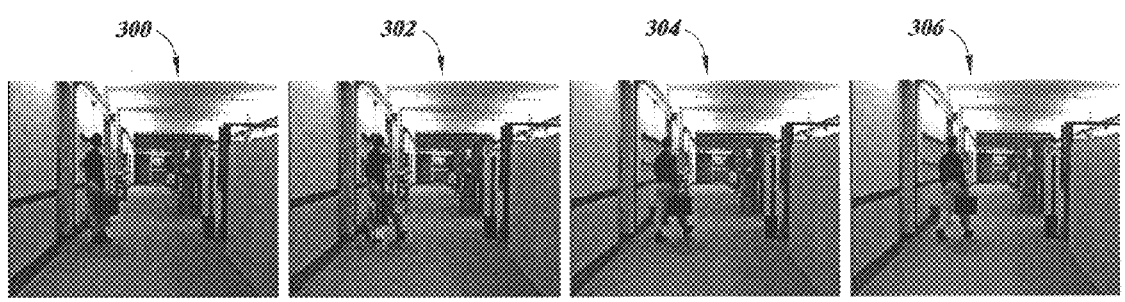
FIG. 3 is a sequence of video frames illustrating the stopping of error propagation using RESCU.

FIGS. 2 and 3 show video clips from a proof-of-concept experiment. In FIG. 2, frames 200, 202, 204, and 206 are a series of video frames decoded according to a standard motion compensation technique without using RESCU. The distortion in the second frame 202 of FIG. 2 is due to packet losses, which propagates to successive frames 204 and 206 even though the remaining frames are correctly received in time. FIG. 3 illustrates a series of frames 300, 302, 304, and 306 in which a packet loss occurs in frame 302. However, in FIG. 3, when RESCU is used, the quality of frame 304 immediately recovers from the error when the packets for frame 302 are recovered before the decoding of frame 304. Thus, from FIGS. 2 and 3, it is apparent that RESCU can stop error propagation.

The encoder that encodes video frames to be transmitted over a packet network can determine the PTDD based on the current traffic conditions in the network. However, if network conditions change (e.g., latency increases) after a periodic frame is sent, that frame on the way to the destination might have too short PTDD for the changed environment. This could cause the periodic frame to miss its deadline, resulting in error propagation. Since the frame has been already encoded and transmitted, there is nothing that the encoder can do to save the frame. Cascaded recovery alleviates this problem without involving the encoder. In RESCU, each periodic frame temporally depends on the previous periodic frames. Thus, by employing more reference frame buffers for periodic frames in the decoder, more late packets can be used to restore a sequence of erroneous periodic frames. Cascaded recovery allows packet deadlines to be extended at the receiving times, but not at the encoding times.

When buffers are not available at the receiver, PTDD is too short, or more data packets are lost than parity packets, periodic frames may not be recoverable. This leads to error propagation. To prevent this type of error propagation, the receiver can detect losses in periodic frames not recovered even after a PTDD period, and can notify the sender about these irrecoverable losses. The notification triggers the sender to code the next frame as an intra-frame. The intra-frame stops error propagation due to the earlier losses because the intra-frame does not have temporal signal dependency with any of frames transmitted earlier. This technique, referred to herein as replenishment, can be adopted in any scheme (including H.261). However, it significantly increases bandwidth consumption. The main motivation for RESCU is to provide error-resilience without a significant impact on bandwidth.

The above-described RESCU Patent Application illustrates how retransmission and layered coding can be used along with RESCU. Retransmission is the most commonly used error recovery technique in reliable transport. The sender (or another receiver in the multicast case) simply retransmits the packets reported missing by a receiver. For interactive video transmission, conventional schemes require retransmitted packets to arrive within a single frame interval after the time that they are first lost. However, the associated delays in detecting and retransmitting the lost packets are often larger than one frame interval. In contrast, RESCU allows these retransmission delays to be masked out since retransmitting packets need to be received only within a PTDD period.

Figure 4:
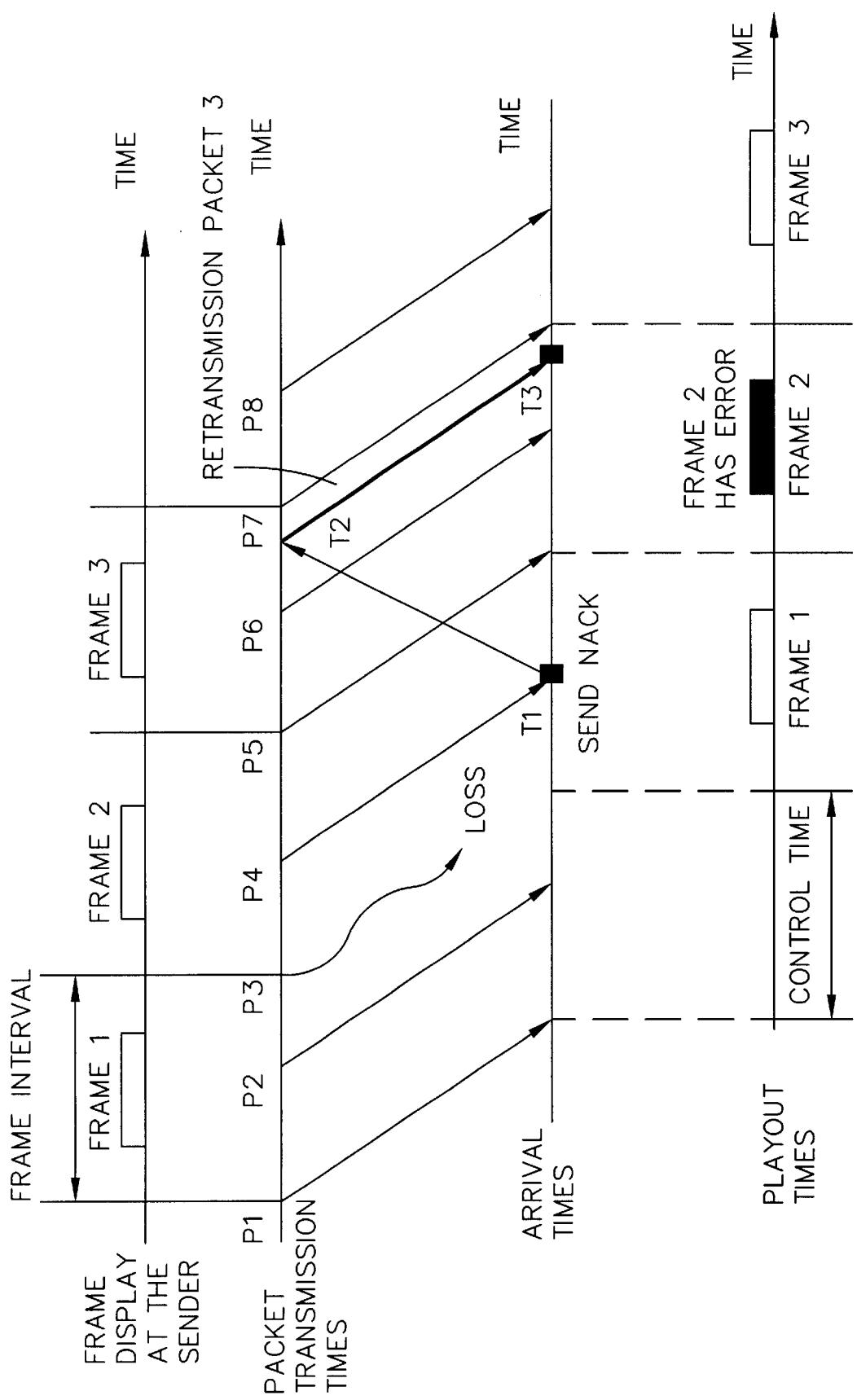
FIG. 4 is a timing diagram illustrating the recovery of frames using retransmission.

FIG. 4 illustrates error recovery using retransmission in a video stream containing two packets per frame and PTDD 2. In FIG. 4, packets P1–P8 are transmitted from a sender to a receiver. The packets are used by the receiver to build and display video frames 1–3. In this example, packet P3 is lost, and the receiver receives packet P4 at time T1 and, recognizing that packet P3 has not been received, sends a retransmission request (NACK) to the sender. The sender receives the NACK at time T2 and retransmits packet P4. The retransmitted packet arrives at time T3, which is before frame 3 is displayed. Packet P3 is then used to restore the R-frame of frame 3 (frame 1), so frame 3 can be decoded and displayed without an error.

This retransmission technique is fundamentally different from other retransmission schemes in that it does not introduce any delay in frame playout times. In interactive video conferencing, introducing a delay in frame playout times severely impairs interactive communication.

FEC-based Loss Recovery

One main disadvantage of retransmission-based error recovery is that its performance is too sensitive to transmission delay. Although RESCU can accommodate larger transmission delay than conventional retransmission schemes, a larger transmission delay requires a larger PTDD period. As PTDD increases, compression efficiency decreases because two consecutive periodic frames may not have much temporal redundancy, and the TDD of non-periodic frames also increases. In addition, packet losses in periodic frames can be restored only after one round-trip time. Thus, during the retransmission time, non-periodic frames can have errors propagated from the erroneous periodic frames.

Furthermore, over direct broadcast satellite links or cable modems, feedback channels are highly bandwidth limited and contention-based. Some mobile wireless hosts simply do not have extra capacity to frequently send feedback to the sender. In video multicast, it is not desirable to have direct feedback from each receiver to the sender because of the known ramification of the acknowledgment implosion problem. In all of these circumstances, using feedback is very limiting. Even when a sufficient amount of feedback can be used, retransmission-based techniques which have a very high sensitivity to network latencies become ineffective.

Forward error correction (FEC) is a compelling alternative for all these environments. A Reed Solomon Erasure correcting code (RSE code) is a commonly used FEC encoder where k source packets of P bits, $d_1, d_2, \ldots, d_k$, are encoded into n>k packets of P bits (i.e., n−k parity packets, $p_1, p_2, \ldots, P_{n-k}$). These n packets are referred to as a FEC block. The RSE decoder at the receiver site can reconstruct the source data packets using any k packets out of its FEC block. Efficient (n, k) RSE encoding and decoding algorithms have been developed and implemented to achieve real-time performance. For instance, one conventional software coder can achieve a throughput of 11 MB/s on a 133 MHz PENTIUM® processor available from Intel Corporation.

In combining RESCU with FEC, the original data of a periodic frame is packetized into k source packets and transmitted over the frame interval of the periodic frame. A frame interval refers to the time to transmit all of the data packets of a periodic frame. After the frame interval for the periodic frame, n–k parity packets for the periodic frame are transmitted over the PTDD period. The transmission time of each parity packet is evenly spaced over the period, interleaving with the packets of other frames.

Figure 5A:
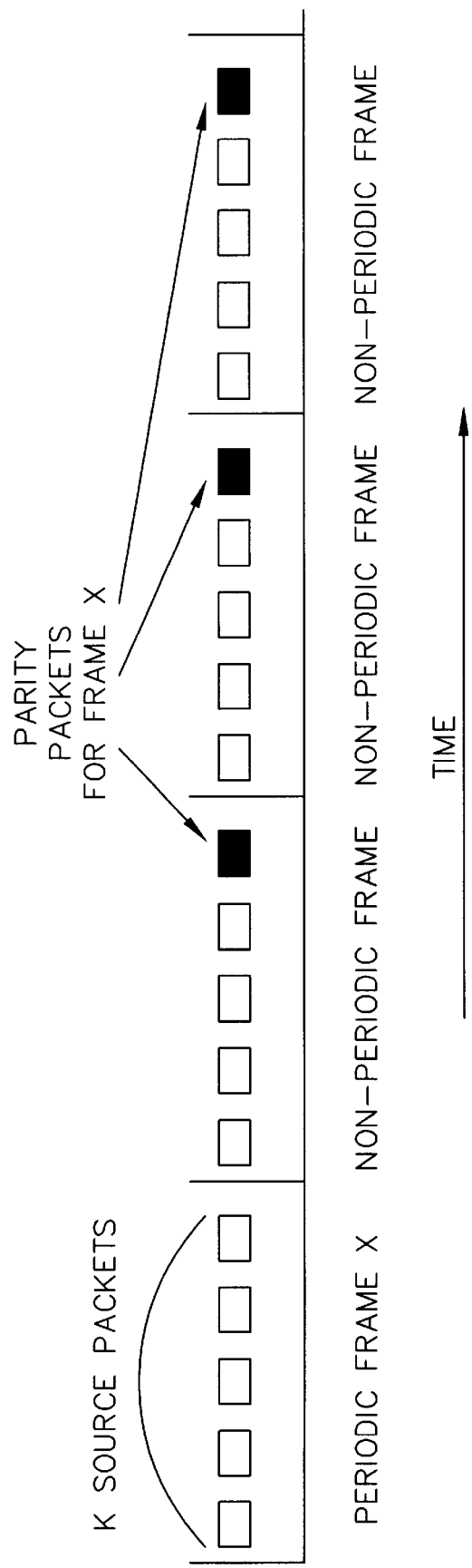
FIG. 5(a) is a timing diagram illustrating interleaving of FEC packets with data packets according to an embodiment of the present invention.

FIG. 5(a) shows a sequence of data and parity packets that may be generated by a transmitter according to a present embodiment of the present invention. In FIG. 5(a), k source packets for periodic frame X are transmitted during the frame interval for periodic frame X. n–k parity packets for periodic frame X are transmitted during frame intervals following that of periodic frame X, but within the PTDD period for periodic frame X. When several data packets are lost, the corresponding periodic frame and, accordingly, its dependent non-periodic frames will be displayed with errors. However, as successive parity packets are received to recover the original data packets, the periodic frame can be restored. This will cause the remaining non-periodic frames within the PTDD period and the next periodic frame to be displayed without errors if these frames are correctly received. In addition, because the parity packets for the periodic frame X are interleaved with the data packets of non-periodic frames transmitted after periodic frame X, the sequence is less susceptible to bursty losses.

Conventional FEC schemes can be categorized into two types. One type of scheme includes transmitting both data and their parity packets within the same frame interval. The other type of scheme includes transmitting the parity packets in later frame intervals than the interval in which data packets are sent. The former scheme is susceptible to burst packet losses and since FEC is applied to a block of packets, before FEC packets are computed and transmitted, large delay must transpire. The latter scheme has to introduce additional delays in frame playout times to allow enough time for the receiver to receive parity packets and restore the currently displayed images. Although these schemes can be effective for a one-way near-real-time video transmission, both schemes can seriously impair interactive video communication.

In contrast, the FEC transmission scheme according to the present invention does not have these drawbacks. In RESCU, FEC packets of a periodic frame and data packets of non-periodic frame can be interleaved, thus greatly minimizing chances of more than one FEC packet being lost in a burst. As soon as enough parity packets (equal to the number of lost data packets of the periodic frame) are received, the periodic frame and the succeeding frames can be restored with no traces of distortion, thus stopping error propagation quickly.

When more data packets are lost than parity packets received, periodic frames may not be recoverable. This leads to error propagation. To prevent this type of error propagation, intra-frame replenishment can be applied. However, replenishments are costly in terms of bandwidth usage and hence should be avoided, if possible. Long loss periods are relatively rare and lost packets are generally dispersed throughout the stream of packets received at a destination. Hence, a small portion of the total bandwidth is enough for FEC packets. The experimental results discussed below show that about 10 percent of the bandwidth is enough to recover from losses in most of the cases and that FEC packets greatly reduce the need for replenishments.

Cascaded Recovery and Optimized Cascaded Recovery Using RESCU

Figure 5B:
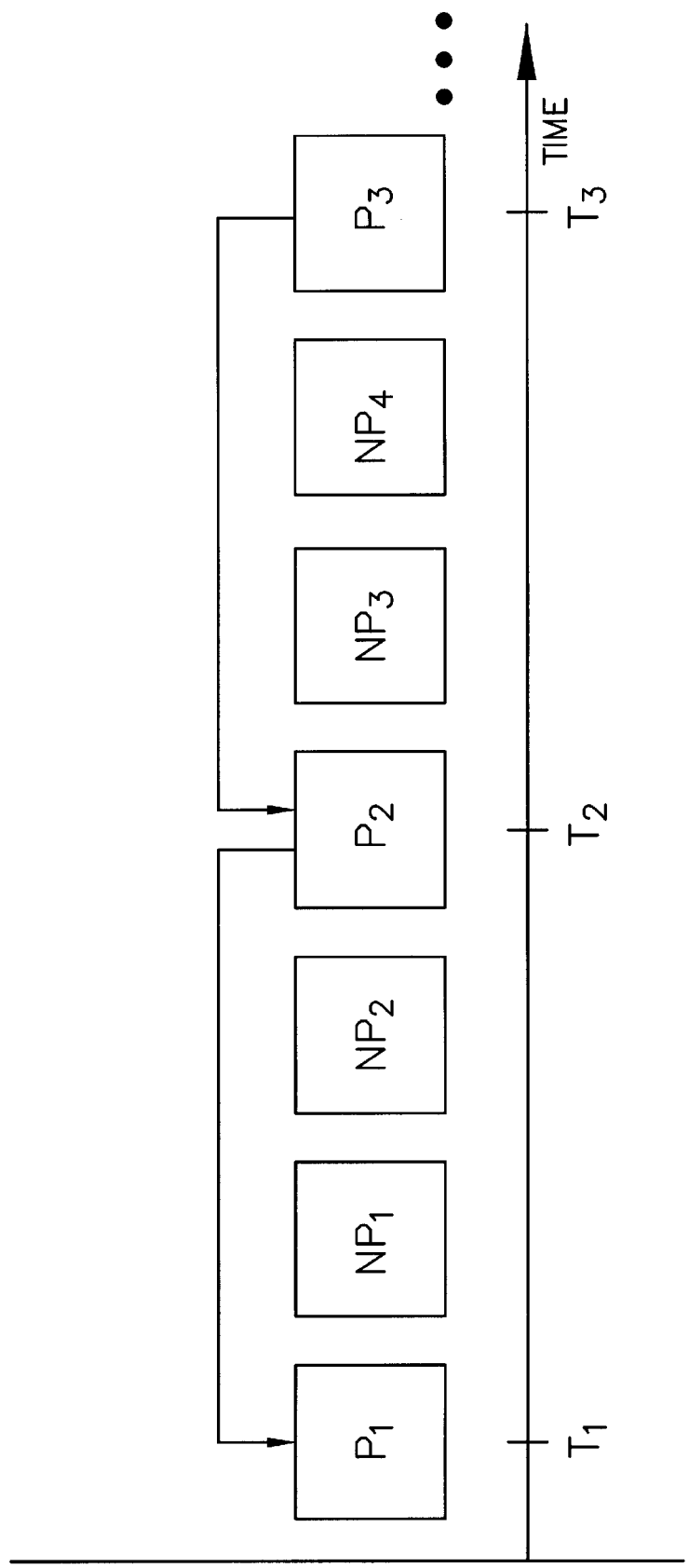
FIG. 5(b) is a timing diagram illustrating cascaded error recovery and optimized cascaded error recovery according to an embodiment of the present invention.

According to another aspect, the present invention includes methods and systems for cascaded error recovery and optimized cascaded error recovery using FEC, RESCU, and motion estimation techniques. These techniques will be explained with regard to FIG. 5(b). In FIG. 5(b), a plurality of periodic frames P1–P3 are received by a receiver. The periodic frames are separated by non-periodic frames NP1–NP4. The times T1–T3 represent the respective scheduled display times of periodic frames P1–P3. In one example, it is assumed that periodic frame P1 is received with errors. Thus, absent any error recovery, the error will propagate to periodic frames P2 and P3. It is also assumed that packets for periodic frames P2 and P3 are received without errors. Thus, the only errors appearing in frames P2 and P3 are the errors caused by the lost packets from frame P1. From the discussion above, it is apparent that the errors in frame P1 can be repaired even after the display time of frame P1. Such errors can be corrected using FEC or retransmission. However, using the method discussed above, such error recovery packets must arrive before time T2 to be useful in correcting errors in periodic frame P2. According to the present embodiment, even if error recovery packets arrive after time T2, these packets can be used to stop error propagation.

For example, if the error recovery packets for frame P1 arrive between times T2 and T3, according to cascaded error recovery, these frames can be used to restore frame P1. Frame P1 can then be used to correct the errors in frame P2, even though frame P2 has already been displayed. However, because frame P3 has not been displayed, and P2 is a reference frame for P3, P3 can be repaired before its display time. Accordingly, cascaded error recovery allows error recovery packets to be useful even when the error recovery packets arrive after the display time of an n-th periodic frame that depends on an $(n-1)^{th}$ frame to which the error recovery packets apply.

According to another embodiment, the present invention includes methods and systems for optimized cascaded recovery. Optimized cascaded recovery combines cascaded recovery as described above with motion estimation. In this example, the conditions are the same as those described above with respect cascaded error recovery. That is, frame P1 is received with errors, frames P2 and P3 are received correctly and the repair packets for frame P1 arrive between times T2 and T3. Similar to cascaded recovery, when the error recovery packets arrive, they are used to restore frame P1. However, rather than repairing frame P2 and using frame P2 to repair frame P3, motion estimation is used to determine the effects of the errors in frame P1 on frames P2 and P3. Such motion estimation techniques include the determining a motion vector from the erroneously received portion of frame P1 to frame P2 and from frame P2 to frame P3. Such techniques are known to those of ordinary skill in the art and need not be described in detail herein. What is important for purposes of the present invention is that it is not necessary to restore frame P2 in order for frame P3 to be displayed correctly. That is, frame P3 can be restored based on restored frame P1 and motion estimation.

FEC and RESCU Implementation Details

According to an embodiment of the invention, Forward Error Correction (FEC) is used to protect the packets of a periodic frame (i.e., a frame on which some succeeding frame depends on) from packet losses. A Vandermonde-matrix-based Linear Block Coding (LBC) software FEC encoder, which has been modified for on-the-fly encoding, can be used for FEC-based RESCU encoding according to the present embodiment. Similarly, a Vandermonde-matrix-based LBC software FEC decoder, which has been modified for on-the-fly decoding, can be used for FEC-based RESCU decoding according to the present embodiment.

FEC helps a receiver to recover from packet losses by transmitting redundant information, which allows the reconstruction of some amount of missing data, without the need for retransmissions. For this, the FEC encoder takes a set of packets from the media stream to be protected, applies a matrix-based transformation across the payload as well as the components of the real time protocol (RTP) headers and generates a FEC packet. This FEC information can be further encapsulated into an RTP packet by the method described below. The resulting packet contains enough information for a receiver to use to recover any one of the packets used to generate this FEC packet, including the payload and the RTP headers.

Typically, a FEC encoder takes k data packets, k being the blocksize, and encodes it into (n−k) FEC packets. Such an encoder is said to perform (n,k) encoding. An (n,k) coding scheme can tolerate up to k packet losses among the n packets (data+FEC) that are involved in one FEC operation. The conventional LBC software encoder mentioned above performs (n,k) coding, but this is not appropriate for video applications. The reason that (n,k) coding is not appropriate for video applications is that in a RESCU video transmission scenario, both the blocksize (number of input data packets) and the number of parity packets that protect this data vary with time. One FEC operation covers the packets of a periodic frame, and different periodic frames have different numbers of packets. Also, the number of FEC packets that need to be sent depends on the perceived state of the network, i.e., under high loss conditions more FEC packets are sent while under low loss conditions only few FEC packets are transmitted. It may even be that below a certain loss threshold, no FEC packets are sent at all. This dynamic nature of the FEC encoding in RESCU requires on-the-fly encoding. On-the-fly encoding enables a generation of FEC packets for a variable sized input one at a time, i.e., on demand.

According to the present invention, on-the-fly encoding is performed to determine the optimum number of FEC packets for given network conditions. Such network conditions are determined based on feedback from the receiver. For example, when a packet is lost, the receiver transmits a negative acknowledgement for that packet to the transmitter. A large number of negative acknowledgements within a predetermined time period indicates network congestion. Accordingly, the transmitter increases the number of FEC packets for a given frame. When network congestion decreases, the number of lost packets decreases, and the number of negative acknowledgements decreases. Accordingly, the transmitter can decrease the number of FEC packets for a given frame. By increasing and decreasing the number of FEC packets in response to network conditions, the present invention achieves more efficient video transmission.

Encoding and Transmission of FEC Packets

Figure 6:
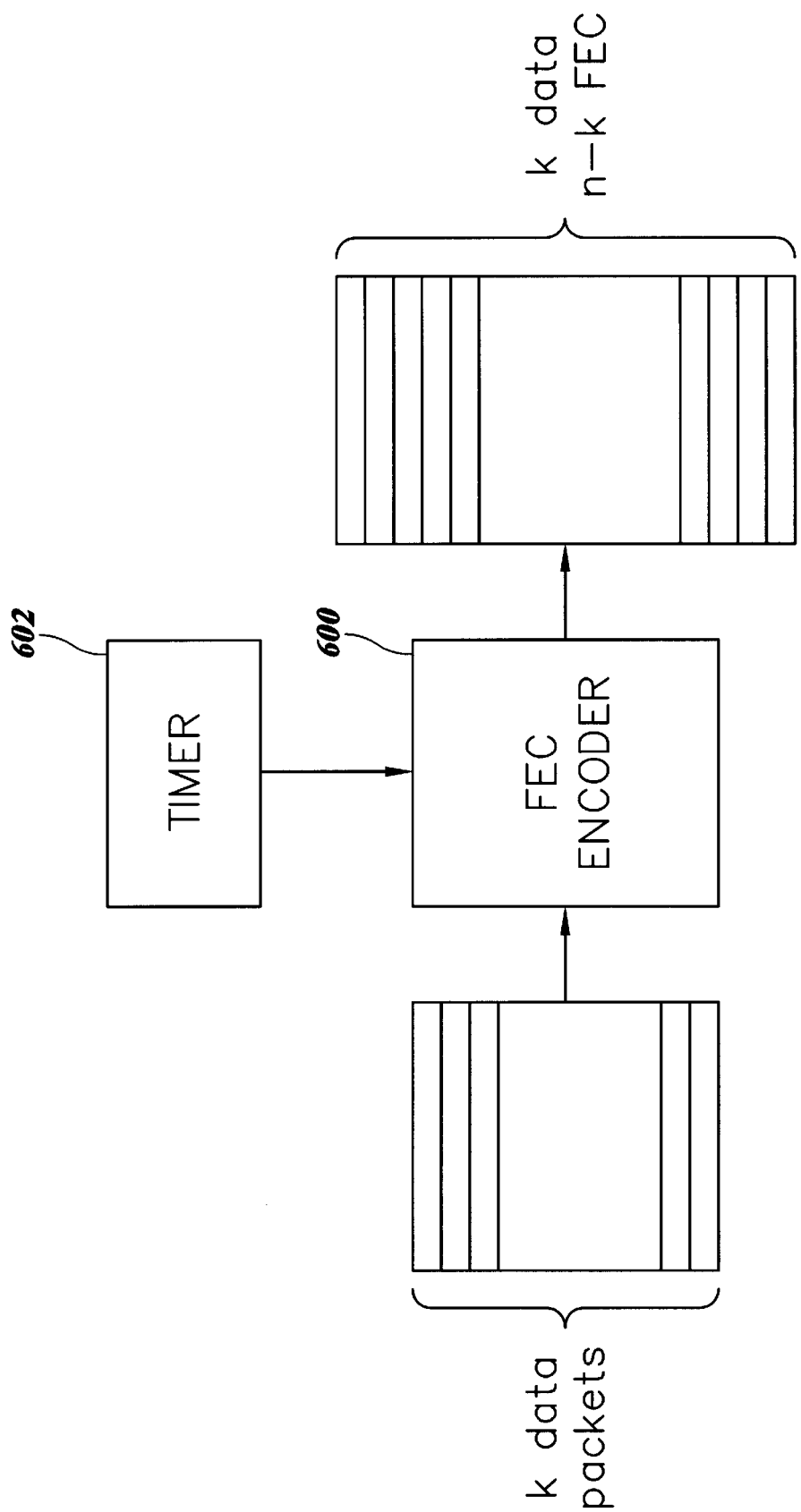
FIG. 6 is a block diagram of a RESCU-FEC encoder according to an embodiment of the present invention.

FIG. 6 illustrates a FEC encoder according to an embodiment of the present invention. In FIG. 6, FEC encoder 600 receives k data packets and outputs k data packets plus n−k FEC packets, where n is an integer that depends on network conditions, as described above. FEC encoder 600 may be a Vandermonde-matrix-based linear block encoder modified for on-the-fly encoding, as described above. Such an encoder may be implemented in hardware, software, or a combination of hardware and software. For example, FEC encoder 600 may be implemented in software adapted to execute in a general purpose computer.

FEC encoder 600 is initialized by creating the appropriate generator matrix, which defines the linear combination that should be used to generate FEC packets from data packets. The generator matrix is allocated so as to accommodate the maximum blocksize that will be encountered. By overprovisioning space for the generator matrix, the time for encoding each periodic frame can be reduced. The time saving occurs because the generator matrix does not require initialization each time the blocksize changes. FEC encoder 600 is also associated with a timer 602, which controls the exact instants at which a FEC packet is encoded and transmitted.

After a periodic frame is encoded, the blocksize of the FEC encoder is set. Then, one by one, the packets are fed into the FEC encoder and stored. For every periodic frame, the number of FEC packets, NFEC, needed to protect that frame is determined and the appropriate interval between consecutive FEC packets required to protect the FEC packets from burst losses. This calculation is performed using the current estimate of the network state and the number of packets in the frame being protected.

If NFEC>0, FEC timer 602 is started with a timeout value equal to the FEC interval. When the timer expires, control passes to FEC encoder 600. FEC encoder 600 uses on-the-fly encoding, as described above, to encode the next FEC packet. Each FEC packet is uniquely identified by an index number. Two FEC packets that have been generated using the same set of data packets as input will differ in content, if they have different indices. If a FEC packet has an index n, it means that this is the $n^{th}$ FEC packet that has been generated by using the current set of data packets. Each time the FEC timer expires, the FEC index is incremented by one and the next FEC packet is encoded. The encoding is based on Vandermonde matrices.

Encoding may continue as long as the FEC timer is active. The FEC timer is deactivated when either NFEC packets are encoded and transmitted for a periodic frame, or there has been a PTDD adjustment, which means that the next frame is going to be a periodic frame and a fresh FEC encoding round is to be started.

RTP Packetization of a FEC Packet

Although an RTP payload format for generic FEC coding is available, conventional RTP payload formats allow for one FEC packet to protect at most 24 data packets. Since the number of packets in a video frame can be more than 24 (e.g., in an I-frame), the present invention includes a new FEC packet format that will allow a FEC packet to protect a maximum of 256 packets.

Figure 7:
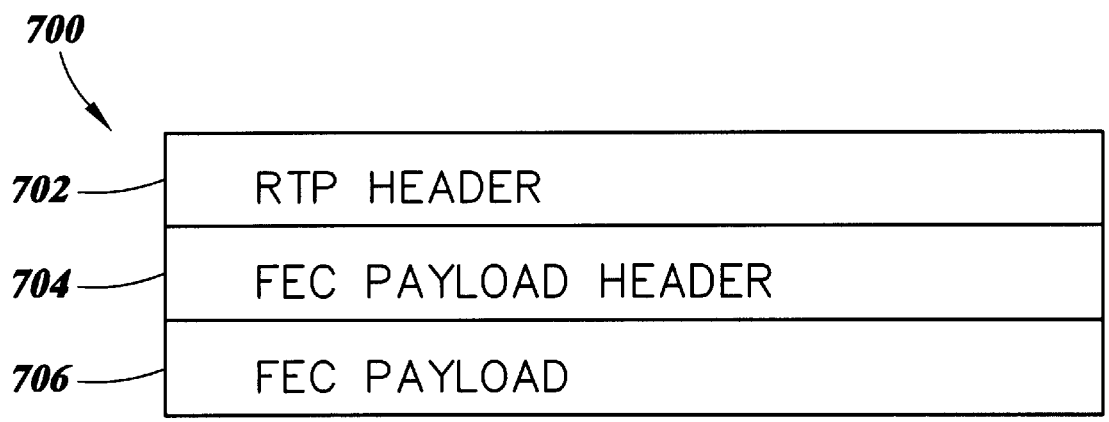
FIG. 7 is a block diagram illustrating RTP packetization of a FEC packet according to an embodiment of the present invention.

FIG. 7 illustrates the format of a FEC packet according to an embodiment of the present invention. In FIG. 7, FEC packet 700 includes RTP header 702, FEC payload header 704, and FEC payload 706.

RTP header 702 of FEC packet 700 contains the following information:

The payload type in RTP header 702 identifies the packet as a FEC packet. This facilitates demultiplexing the packet at the receiver to the FEC decoder.

The RTP timestamp carried in RTP header 702 of a FEC packet is same as that carried in the RTP H.263+ packets of the video frame to which the FEC packet belongs. The timestamp represents the sampling instant of the first data byte that has been protected by the FEC packet. This timestamp associates the FEC packet with the data packets it protects. Since a FEC packet is generated using packets from a single frame, the timestamp is a unique identifier that provides this association.

The FEC packets are sent as a separate stream (i.e., on a separate layer), so that receivers that are not FEC-capable can interoperate with FEC-capable receivers. Receivers that are not FEC-capable will simply not subscribe to the FEC layer and thus will not receive FEC packets. This, coupled with the fact that systematic coding—the original data stream is sent unmodified along with the redundant data—is utilized, makes it possible for FEC-incapable receivers to understand the data they receive, albeit without the error protection. The RTP sequence number gives the sequence number of the FEC packet in the FEC stream.

Figure 8:
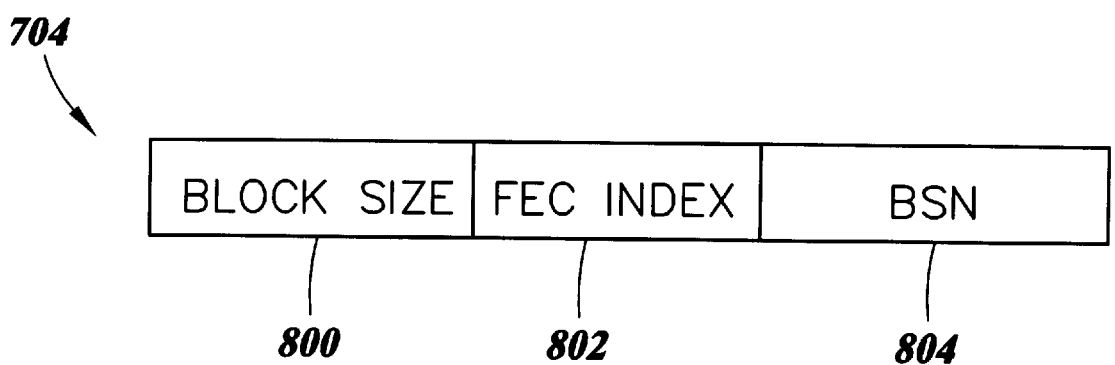
FIG. 8 is a block diagram of a FEC payload header according to an embodiment of the present invention.

FEC payload header 704 contains information that will allow the decoder to use a FEC packet for recovering lost video packets. For the FEC decoder to make use of a FEC packet, it needs to know the number of video packets that have been used to generate the FEC packet (the blocksize), the index of the FEC packet, and the indices of the data packets that have been successfully received (or recovered). This information can be communicated to the receiver using data fields in FEC payload header 704. FIG. 8 illustrates an exemplary format for FEC payload header 704. In FIG. 8, FEC payload header 704 includes blocksize field 800, FEC index 804, and base sequence field 806.

The data included in fields 800, 802, and 804 is as follows:

Blocksize field 800 stores a value indicative of the number of video packets that have been used to generate the FEC packet. This number can change from frame to frame. By encoding the blocksize in the FEC header, the present invention allows the receiver to use FEC packets, even when the blocksize changes dynamically.

FEC Index field 802 stores a value indicative of the index of the FEC packet, starting from 0 and incremented by one for every additional FEC packet transmitted for the same periodic frame. This number uniquely identifies a FEC packet from other FEC packets that have been generated using the same set of video packets.

BSN (Base Sequence Number) field 804 stores the 16-bit RTP sequence number of the first packet that has been used to generate this FEC packet. Since packets are fed in sequence to the FEC encoder, the index of a video packet being used for decoding can be determined simply by subtracting the BSN from the sequence number of that data packet.

Once the FEC packet has been generated and RTP packetized, it is transmitted over the FEC layer to the destination.

Decoding FEC Packets

The receiver keeps track of the number of data and FEC packets that have been received for every frame. If the receiver has received at least one FEC packet, it can determine the blocksize (the number of data packets in that frame) i.e., from blocksize field 800 in the FEC packet. If k is the blocksize, the receiver should receive at least k packets of data and FEC combined. When this requisite number of packets is received and it is found that at least one data packet has been lost, the decoder attempts to recover the lost data packets from the FEC packets that have been received.

The FEC decoder obtains the indices of the FEC packets from the FEC header. Since the FEC packets also contain the sequence number of the first data packet that has been used for encoding (the Base Sequence Number), and each data packet contains its own sequence number, the indices of the received data packets are determined by subtracting the BSN from the sequence number. Thus, the required information for successfully retrieving the lost packets is built and packet recovery takes place.

Experimental Results

The RESCU Patent Application illustrates the efficacy of RESCU with retransmission. However, retransmission scheme can be effective only when the RTT is small enough.

The main objective of the experiments discussed below is to show that FEC integrated with RESCU is a very effective error recovery technique for real-time interactive video transmission over the Internet. This efficacy is shown through video transmission experiments over transpacific Internet connection from the East coast of the U.S. In these experiments, the RESCU codec is implemented by modifying an implementation of H.261. This codec is used to compare the performance of the FEC and ARQ according to the present invention scheme in terms of the end video quality and bandwidth overhead. For convenience, the FEC scheme integrated with RESCU is referred to as RESCU-FEC and the retransmission scheme as RESCU-REC.

The experiments were conducted with the following goals in mind:

1. The final video quality sustained by RESCU-REC and associated bit efficiency is illustrated. In addition, the high sensitivity of RESCU-REC to varying network delays is illustrated.
2. The final video quality sustained by RESCU-FEC and associated bit efficiency is illustrated. In addition, the insensitivity of RESCU-FEC to varying network delays and its ability to quickly recover lost packets is illustrated.
3. The bit efficiency advantage of RESCU-FEC over H.261 in achieving the same level of error resilience is illustrated. H.261 can improve error resilience by transmitting intra-frames more frequently. The amount of bandwidth required for H.261 to achieve the same video quality as RESCU-FEC is demonstrated.
4. The performance advantage of RESCU-FEC over a conventional FEC scheme which transmits the FEC redundant packets of each frame at the same frame interval as the original frame is demonstrated. The advantage can be shown by determining the amount of bandwidth required for the conventional scheme to achieve the same video quality as RESCU-FEC.

Testing Methodology

RESCU is implemented based on a H.261 codec. A full-search motion estimation technique is utilized for all experiments, and PTDD is varied for different experiments. RESCU with one additional buffer is used in the retransmission scheme for cascaded recovery. The test image sequences used are obtained from MPEG-4 test sequences encoded by a Telnor H.263 encoder. The results for an MPEG-4 class A test video sequence called container are shown. For every experiment, the frame rate is set to 10 frames per second. An image size of CIF (352×288 color) is used for experiments. Both of the codecs (RESCU and H.261) use a default quantization step size 8. The test video sequence is first compressed using each codec and the encoded video frame is packetized into approximately 256-byte packets such that the individual packets contain an integral number of Macro Blocks. In RESCU-FEC, a specified number of parity packets are evenly spaced in the PTDD. Then, a packetized sequence corresponding to 190 frames is generated. This sequence is replayed several times for about 2 minutes (1200 frames). The replay does not affect the integrity of the experiment because the first frame is always intra-coded in all the tested schemes.

Simulation Method

Burst packet losses are modeled using a two state continuous Markov chain $\{X_t\}$ where $X_t \in \{0,1\}$. A packet transferred at time t is lost if $X_t=1$ and not lost if $X_t=0$. The infinitesimal generator of this Markov chain is $$Q = \begin{pmatrix} -\mu_0 & \mu_0 \\ \mu_1 & -\mu_1 \end{pmatrix}$$

The stationary distribution associated with this chain is $\pi=(\pi_0,\pi_1)$ where $\pi_0=\mu_1/(\mu_0+\mu_1)$ and $\pi_1=\mu_0/(\mu_0+\mu_1)$. Let $p_{i,j}(t)$ be the probability that the process is in state j at time t+r given that it was in state i at time r. Let $\lambda$ be the packet transmission rate, b the expected number of consecutively lost packets, and p the packet loss probability. Then $\mu_0=-\pi_1\lambda$ log $(1-1/b)$ and $mu_1=\mu_0(1-p)/p$. The network delay is modeled by the exponential distribution with the mean delay D. Network conditions are characterized by the loss probability p, the mean burst loss length b, and the mean network delay D.

Given a packetized sequence, transmission traces of the sequence are obtained which contain information about the delivery time of each packet and the number of retransmission attempts. Using the above network model, the delivery times are calculated. When retransmission is used for recovery, for each lost packet that belongs to a periodic frame, the decoder determines whether the packet is received by retransmission before its deadline. The deadline is determined by the time period between the initial deadline of the packet and the time when the retransmission is made. Each retransmission attempt costs one round trip time which is calculated from the network model. A packet can be retransmitted as many times as it is allowed by its deadline. When the packet is received by retransmission, the time that the packet is received is recorded.

After obtaining a transmission trace of a video sequence, the decoder is executed on the trace to measure the image distortion due to packet losses. The image distortion is computed using the peak signal-to-noise ratio (PSNR) the decoded images over the original images.

Internet Transmission Test

Actual video transmission tests were conducted over the Internet from Korea to the U.S. These testing sites were chosen because transmission delays between two sites are frequently over 300 ms. The experiments conducted are intentionally biased against retransmission to show the effectiveness of RESCU-FEC over RESCU-REC over the given environment. The transmission tests were conducted every 45 minutes for these days to obtain traces. Each packet of a frame is transmitted at a regular interval by the given frame rate (10 fps) and the number of packets within that frame.

The automatic repeat request (ARQ) scheme of RESCU-REC works as follows. The receiver sends one acknowledgment to the sender for each received frame. An acknowledgment contains information about the missing packets of the last two periodic frames. The sender estimates the current RTT based on the sending time of the acknowledgment and its reception time. The sender maintains a record of most recent timestamp of the retransmission of each packet and does not retransmit the packet unless the difference between that timestamp and the current time is at least as large as the RTT estimate. This mechanism reduces unnecessary retransmissions. Also, whenever the sender comes to know that a periodic frame has not been recovered even after 2 PTDDs, it sends a replenishment (I-frame) to stop error propagation.

Each packetized sequence of RESCU-FEC includes one FEC-redundant packet per frame. Within one PTDD period, the number of FEC packets is equal to the PTDD. Thus, as the PTDD increases, although compression efficiency gets lower, the rate of FEC redundant data over the original data does not change.

For fair comparison between FEC and REC, in the actual transmission tests, only the packetized sequences of RESCU-REC (not FEC) are transmitted. For each transmission test, a 2-minute trace is obtained that records the packet sequence numbers, the arrival times of all received packets and the number of retransmission attempts. Then, each of the obtained traces T are mapped to the packetized sequences of H.261 and RESCU-FEC. First, 2 minute length segments of a packetized sequence S of H.261 and RESCU-FEC are obtained as if they are transmitted in a real test. Each packet p in trace T is mapped to a packet q that has the same sequence number as p. If packet p is received, q is recorded as received and the receiving time of p is assigned to q. Otherwise, q is recorded as lost.

This mapping technique provides an accurate comparison of various transmission schemes because the sequence of all the schemes are mapped to the same trace. The mapping is possible because RESCU-FEC and H.261 have very little or no feedback to be given to the sender. RESCU-FEC uses average RTTs seen by the RESCU-REC traces and an exponential distribution to calculate the time of arrival of a replenishment request when it needs one.

Sixty-six traces were obtained for PTDD 3, and 68 traces were obtained for both PTDDs 6 and 9 through actual transmission. These traces were then mapped to RESCU-FEC and H.261. Using these transmission traces of the video sequence, the line decoder was executed on the traces to measure the distortion in the video frame due to packet losses. The image distortion is computed using the peak signal-to-noise ratio (PSNR) of decoded images over the original images.

Comparison of RESCU-FEC with RESCU-REC

The disadvantage of RESCU-REC is its sensitivity to transmission delay. When transmission is too high, retransmitted packets may not arrive before their deadlines, causing error propagation. This problem is completely eliminated in RESCU-FEC.

Figure 9:
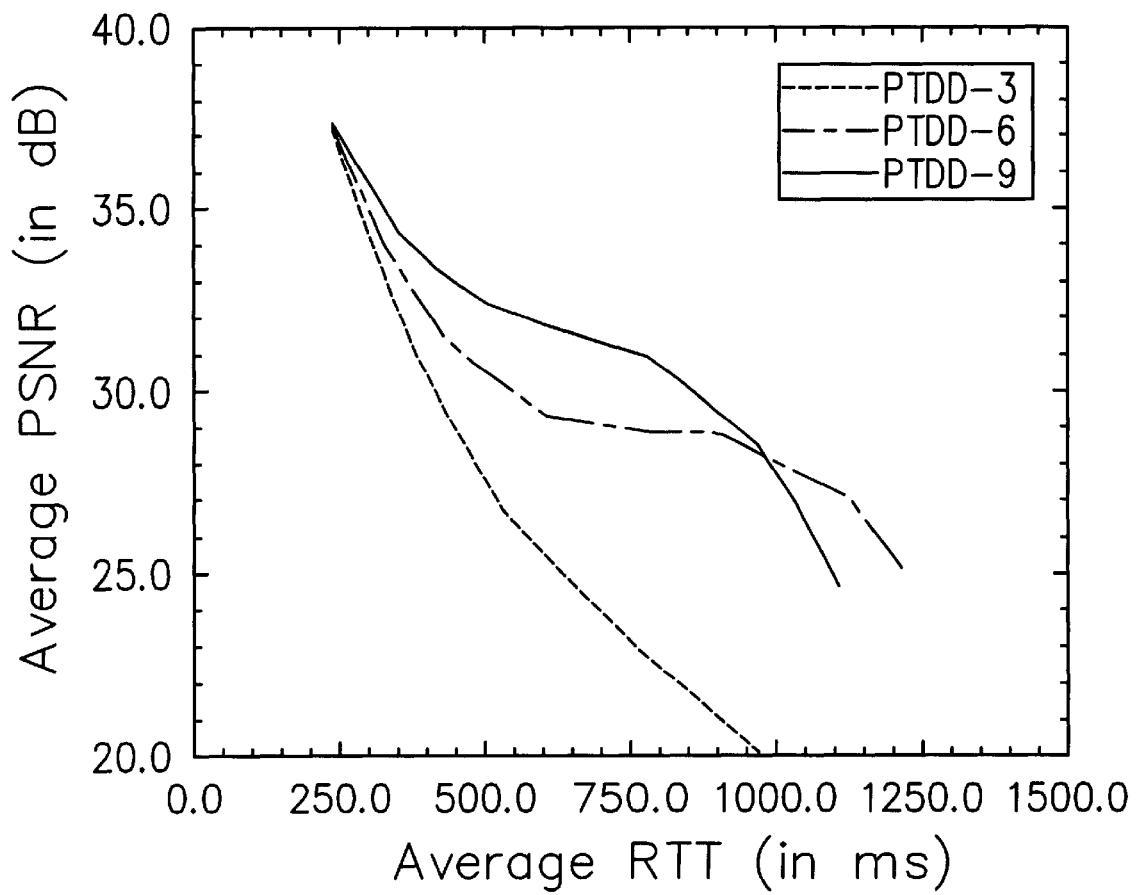
FIG. 9 is a graph illustrating the average peak signal-to-noise ratio (PSNR) of RESCU-REC with different round-trip network delays.
Figure 10:
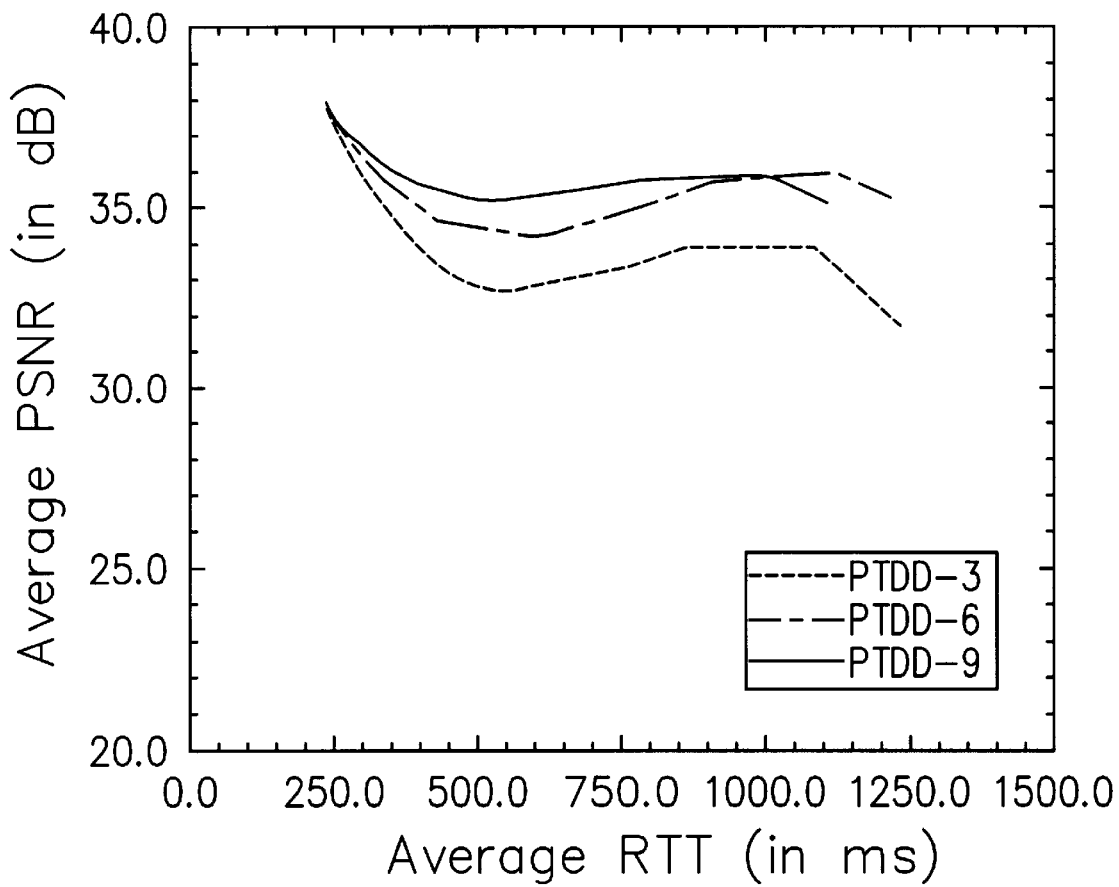
FIG. 10 is a graph illustrating the average PSNR of RESCU-FEC with different round-trip network delays.

FIGS. 9 and 10 clearly show the advantage of RESCU-FEC over RESCU-REC when the round trip time (RTT) is large. These figures are obtained from the Internet transmission tests. The lines are the results from cubic-order regression based on experimental data points.

In FIG. 9, RESCU-REC shows good video quality under low network latency (less than 250 ms) even with a short PTDD of 3. However in all cases, RESCU-REC is seen to be highly sensitive to the network latency. When network delays are long and PTDD is not sufficiently large, most retransmitted packets are not received before their deadlines and video quality degrades. RESCU-REC shows total ineffectiveness under high RTTs. As PTDD becomes larger, the video quality generally improves, but this causes low compression efficiency. In FIG. 10, RESCU-FEC is clearly much less sensitive to RTTs. As RTTs increase, performance degrades because high latency usually occurs at the time of congestion. However, the sustained performance of RESCU-FEC is very high compared to that of RESCU-REC.

Figure 11:
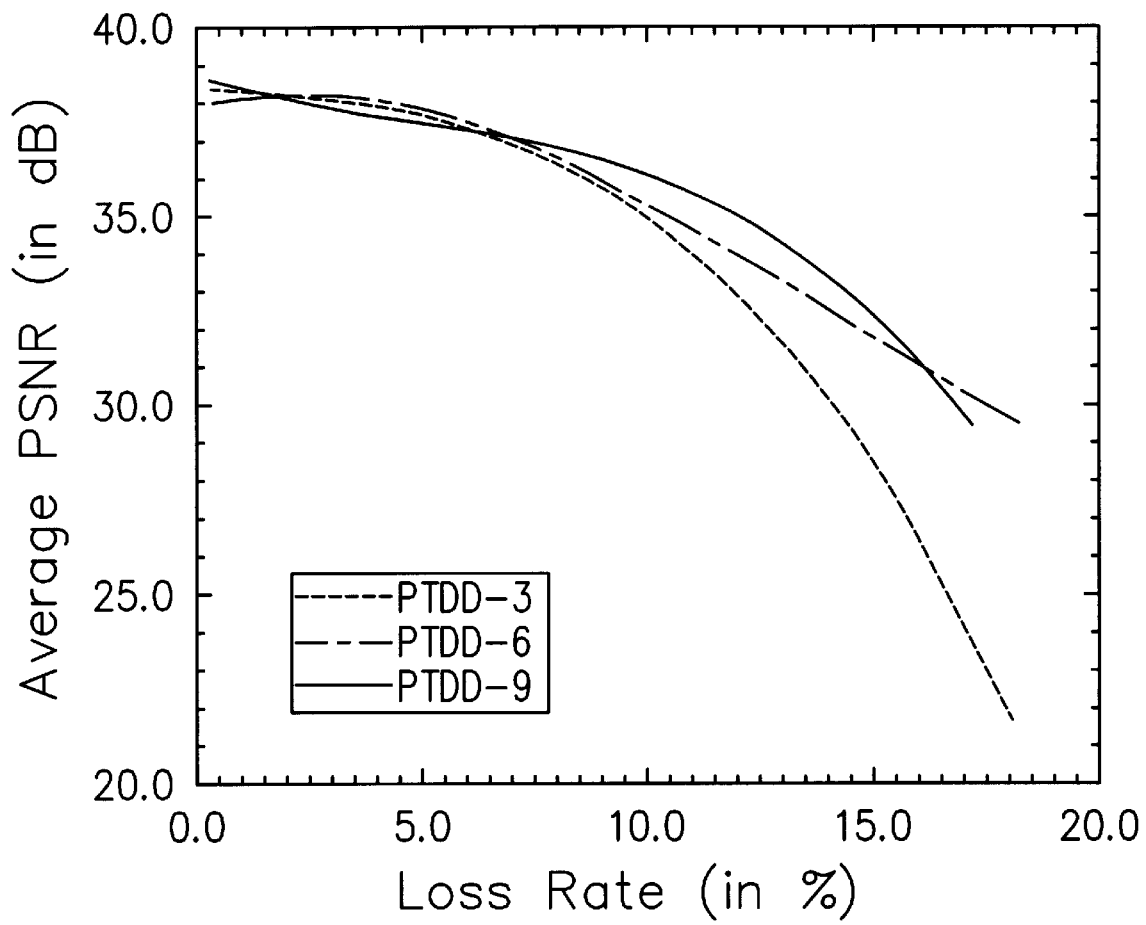
FIG. 11 is a graph illustrating the average PSNR of RESCU-REC with different loss rates for the Internet experiment.
Figure 12:
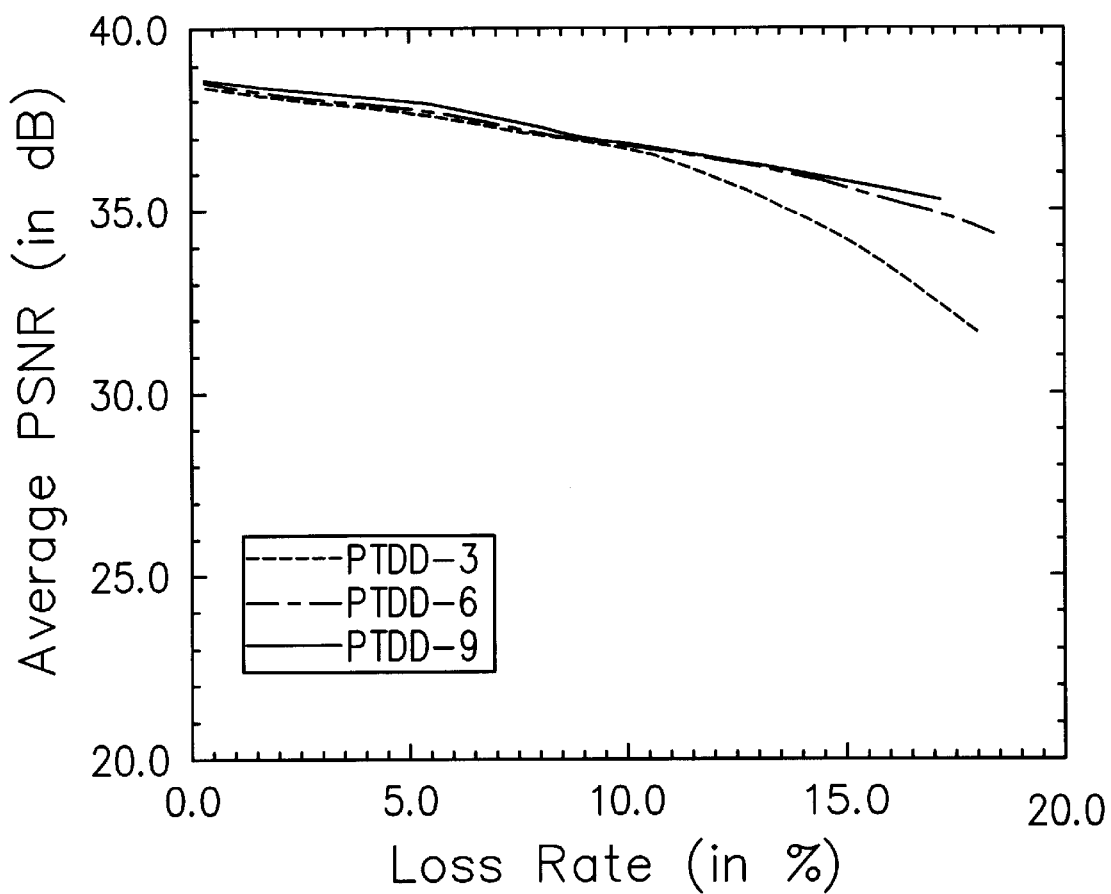
FIG. 12 is a graph illustrating the average PSNR of RESCU-FEC with different loss rates for the Internet experiment.

FIGS. 11 and 12 show the video quality of RESCU-FEC and RESCU-REC over various loss rates. When the loss rate becomes larger than 12%, both techniques suffer their quality. Particularly, the performance of REC becomes highly unpredictable, and sometimes it gives very low video quality (less than 30 dB). This degradation occurs even if REC uses one additional buffer for cascaded recovery (explained in Section 2.1) (i.e., the effective deadline of cascaded REC is twice as much as given PTDD).

Figure 13:
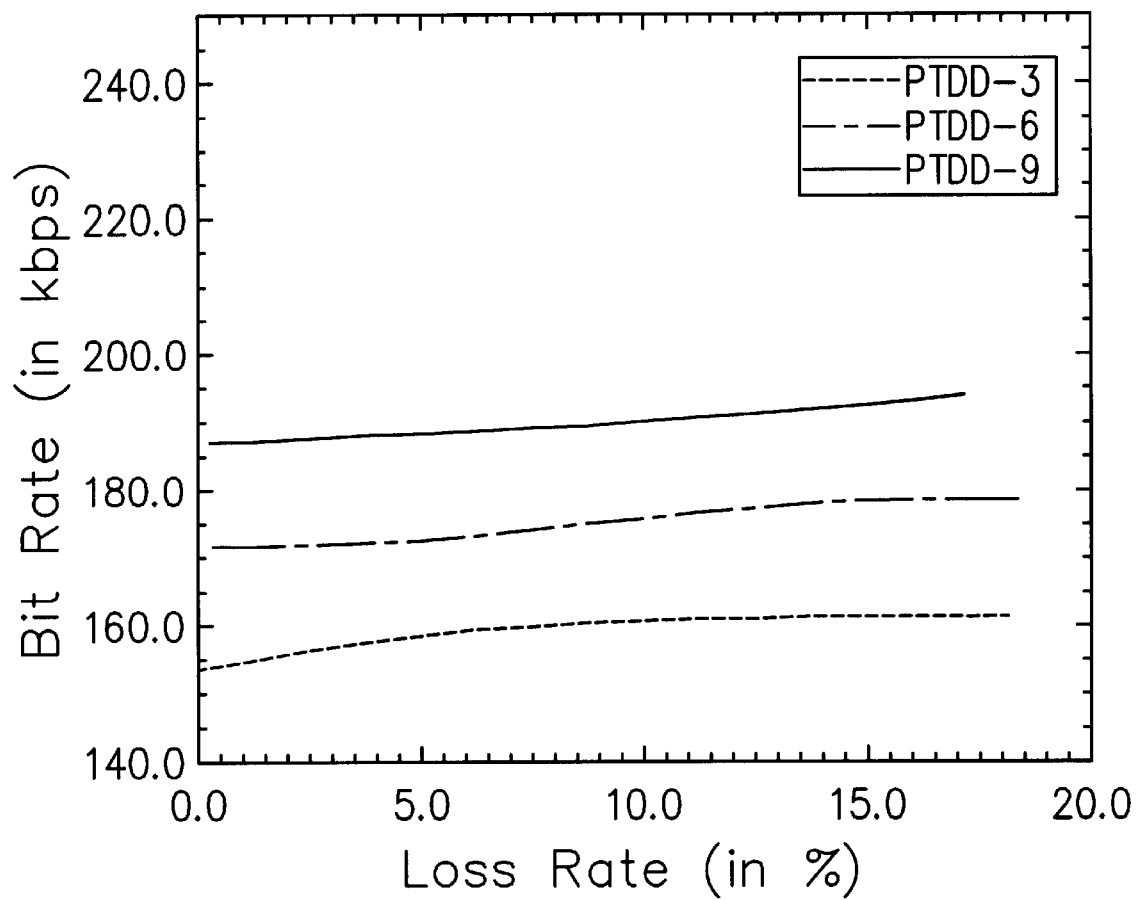
FIG. 13 is a graph illustrating the average bit rate of RESCU-REC with different loss rates for the Internet experiment.
Figure 14:
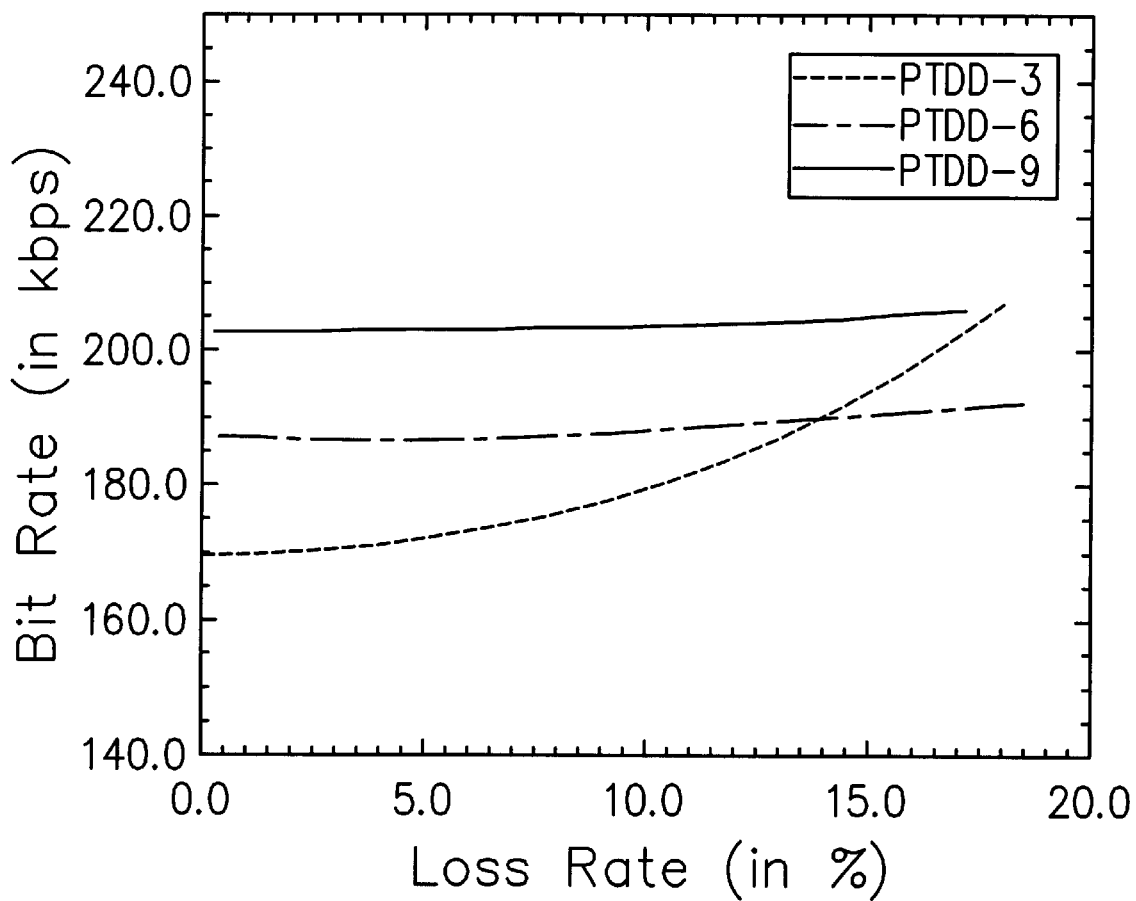
FIG. 14 is a graph illustrating the average bit rate of RESCU-FEC with different loss rates for the Internet experiment.

The better performance of FEC, however, comes at the expense of higher bit rates, as illustrated in FIGS. 13 and 14. The bit rate of FEC is generally 5% to 8% higher than that of REC. The fluctuation in the bit rate of FEC for the transmission tests with the same PTDD is due to the coarseness of timers in controlling transmission rates. There are two reasons why REC gives lower bit rates. First, retransmission occurs only when packet losses occur. In contrast, FEC redundant packets are continually sent regardless of packet losses. Second, REC is less sensitive to the loss burst length. Since retransmitted packets take more than one RTT to arrive, if loss burst starts at the time of the first loss that triggers retransmission, the burst is most likely to be ended by the time when retransmitted packets arrive at the receiver. However, this is not the case for FEC-redundant packets. Although the effect of loss burst is much less critical for the FEC technique according to the present invention than for conventional FEC techniques, the performance of our FEC is still affected by loss burst. For instance, as the loss rate gets larger than about 10%, the total number of losses from a periodic frame is frequently more than 3. This means that periodic frames cannot be recovered with only three FEC packets. This causes the receiver to send a replenishment request to the sender. The large occurrence of replenishment is the reason for the surge in the bandwidth usage for PTDD 3 under a loss rate higher than 13% in FIG. 13.

Simply increasing PTDD without affecting the rate of bit redundancy over the original bit rate significantly improves the quality under high loss rates. If the PTDD is increased to 6 and 6 FEC packets are transmitted, approximately the same percentage of total bandwidth is allocated to FEC redundancy. The results in FIG. 14 show that PTDD 6 provides an adequate amount of protection for all loss rates we observed with only a small number of replenishments. At high loss rates, when RESCU-FEC with PTDD 3 is not able to sustain good video quality in spite of very high bandwidth, RESCU-FEC with PTDD 6 consistently gives better PSNR (more than 35 dB) without any increase in the bandwidth usage. The results obtained for RESCU-FEC and PTDD 9 show that although the PSNR is always high, the gains are not significant enough for the added bandwidth usages.

Figure 15:
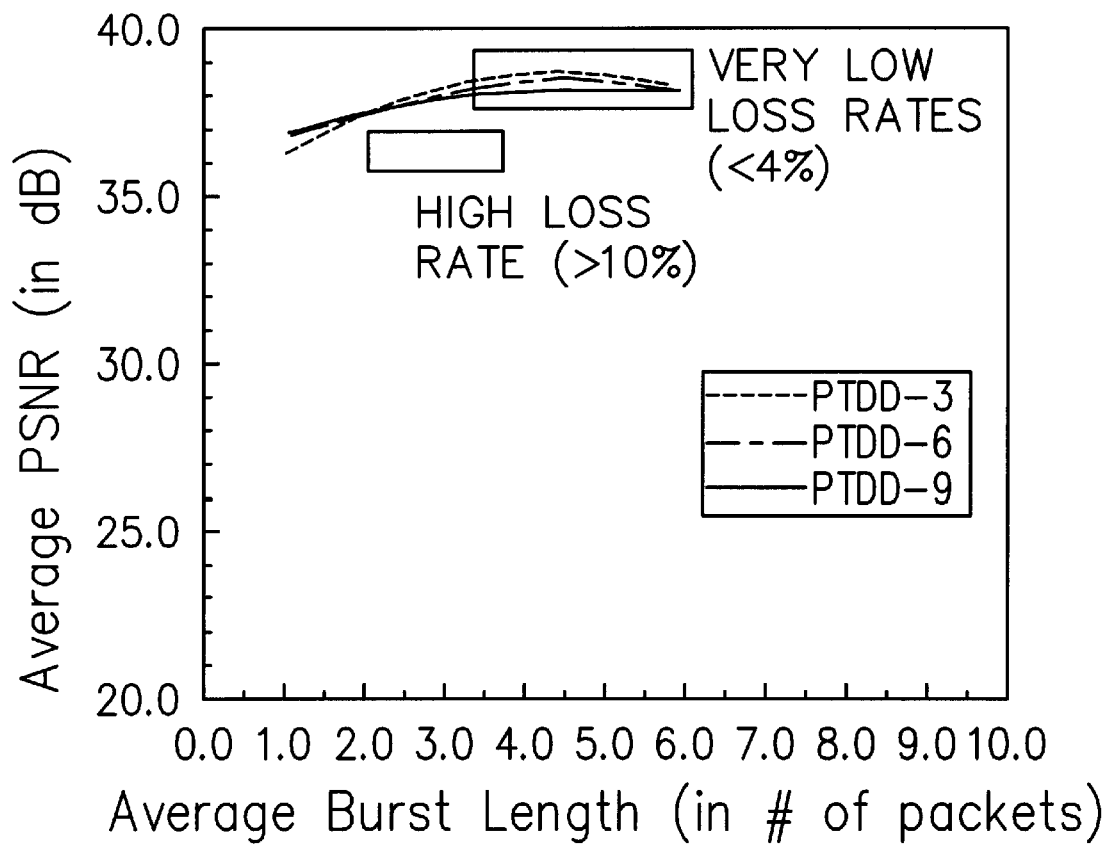
FIG. 15 is a graph illustrating the average PSNR of RESCU-FEC over the average burst length.

To study the impact of burst losses to the image quality of RESCU-FEC, the PSNRs of RESCU-FEC over the average burst lengths (AVL) of obtained traces were analyzed (FIG. 15). Most of long loss burst traces obtained are very low loss rates. They gave long loss burst lengths because they include one or two occurrences of very long burst lengths (larger than 100 packets). When loss rates are low, these traces result in long average burst lengths. Very few instances of long burst occur for high loss rates. Most traces grouped around 1 to 3 AVLs. For these AVLs, RESCU-FEC with PTDD 6 or 9 shows very good performance. Consecutive FEC packets within a PTDD period are very unlikely to lose in a loss burst since they are spaced by one frame interval (about 10 packets). Thus, burst losses happen mostly for the original periodic data packets. Since high loss rate traces have AVLs around 1 to 3, 6 FEC packets in PTDD 6 can effectively recover these losses. The short AVLs obtained for most traces are consistent with conventional experiments, which indicate that long sustained loss bursts are rare in the Internet.

Figure 16:
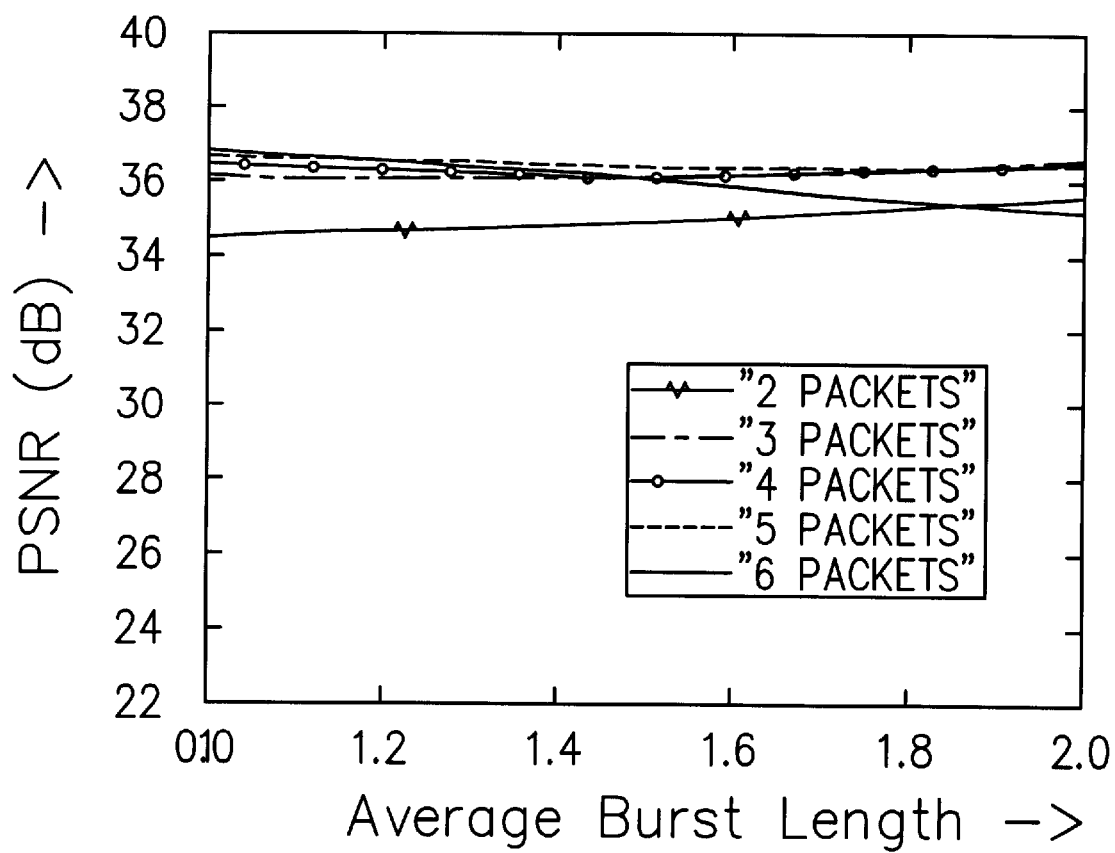
FIG. 16 is a graph illustrating the average PSNR of RESCU-FEC with various numbers of parity packets within PTDD 6 over different loss burst lengths for a simulation.
Figure 17:
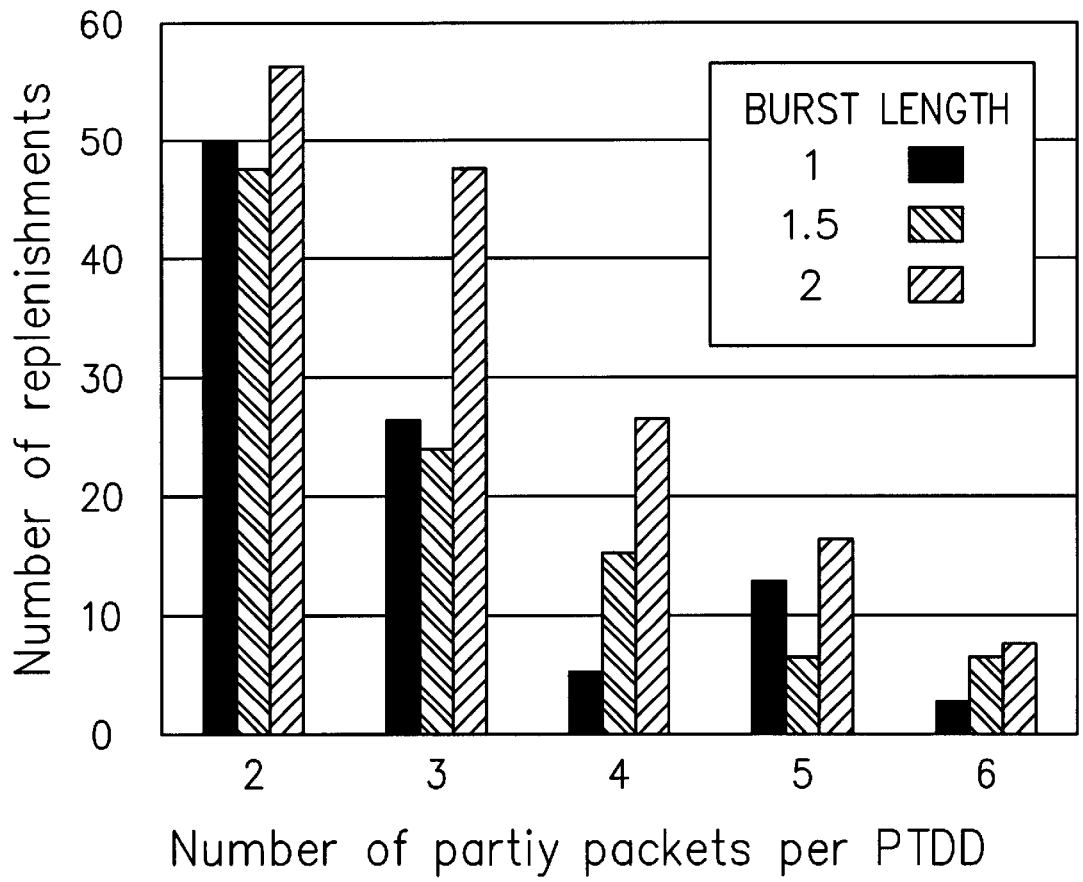
FIG. 17 is a graph illustrating the number of replenishments for RESCU-FEC with various numbers of parity packets within PTDD 6 over different loss burst lengths for a simulation.

In order to further study the behavior of RESCU-FEC under high burst loss environments, simulation experiments were performed. FIGS. 16 and 17 illustrate the impact of burst losses in the performance of RESCU-FEC. The loss rate of 10% is applied to all simulation experiments. While the PSNR remains relatively the same over different burst lengths, the replenishment count shows the effect of bursts. Replenishment with an intra-frame occurs when RESCU-FEC fails. Thus, the count represents how effective RESCU-FEC with a given amount of redundancy can be. For each additional redundant packet with a PTDD period, the bandwidth increases by a factor of about 1.6% since each frame consists of about 10 packets. FIG. 16 clearly illustrates that two parity packets within PTDD 6 are not enough in all loss burst lengths tested-more than 48 replenishments within the 2 minute playout time were made in all cases. The count reduces as more redundant packets are added. It is also shown that a long loss burst length causes more replenishments. Under burst length 1, four parity packets are enough while under burst lengths 1.5 and 2, five and six parity packets are needed which is only 6–8% bit overhead. This indicates that RESCU-FEC can perform very well with only a small amount of redundancy even under high burst losses. Since replenishment confines error propagation very well, the video quality of RESCU-FEC does not show many variations under different burst lengths. However, when only two parity packets are used, the quality degrades quite severely.

In summary, results obtained for RESCU-REC suggest a clear correlation between round trip time and the performance of RESCU-REC. This is one of the main motivations for the design of RESCU-FEC. The advantage of FEC over retransmission is that FEC repairs lost packets more quickly than retransmission since no loss detection and feedback delays are incurred in FEC. In RESCU-REC, lost packets are detected only by a gap in received packet sequence numbers, and furthermore feedback has to travel to the sender to trigger retransmission. RESCU-FEC does not have these problems and is the reason we observe the insensitivity of RESCU-FEC to network latencies. The experiment result indicates that with a small amount of bit overhead (6–8%), RESCU-FEC can achieve good error resilience under significantly high loss rate and loss burst length.

Comparison of RESCU-FEC with H.261

Figure 18:
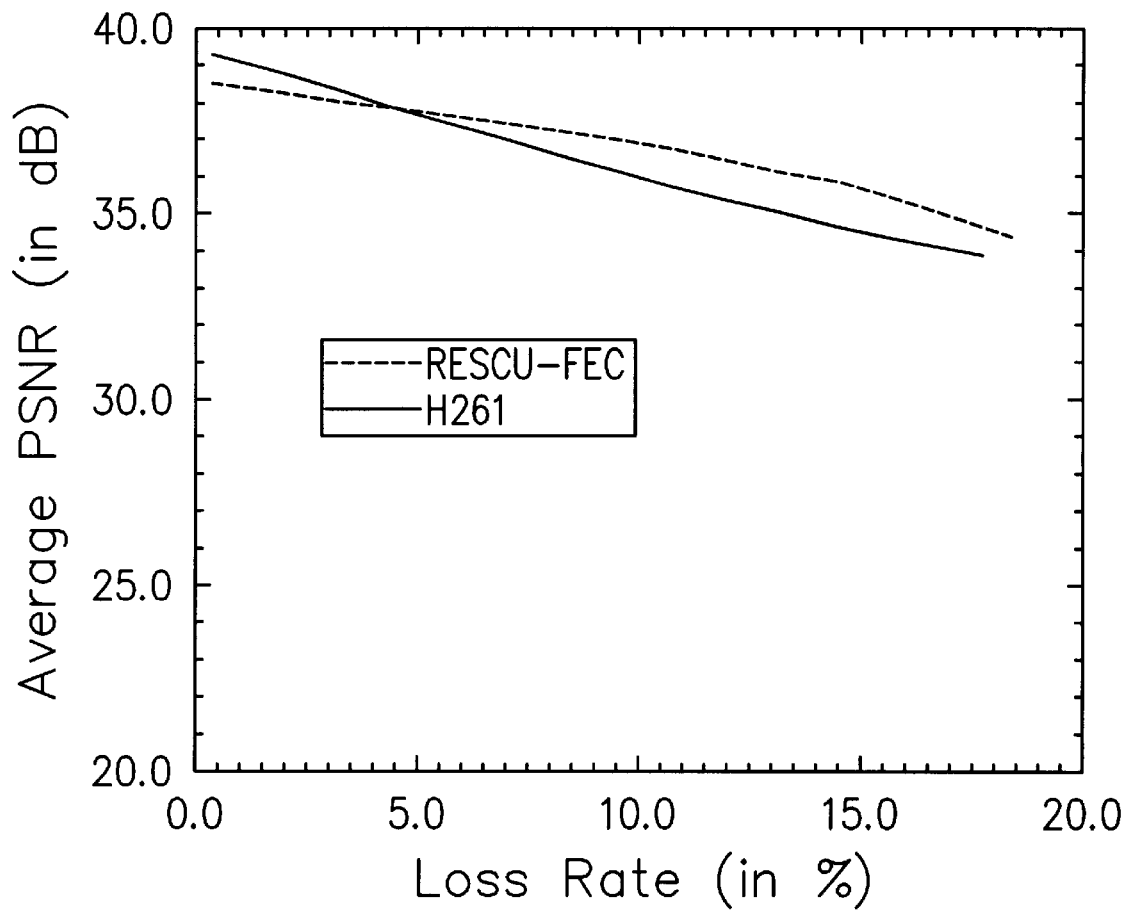
FIG. 18 is a graph illustrating the average PSNR of H.261 with an inter-frame every 5 frames.
Figure 19:
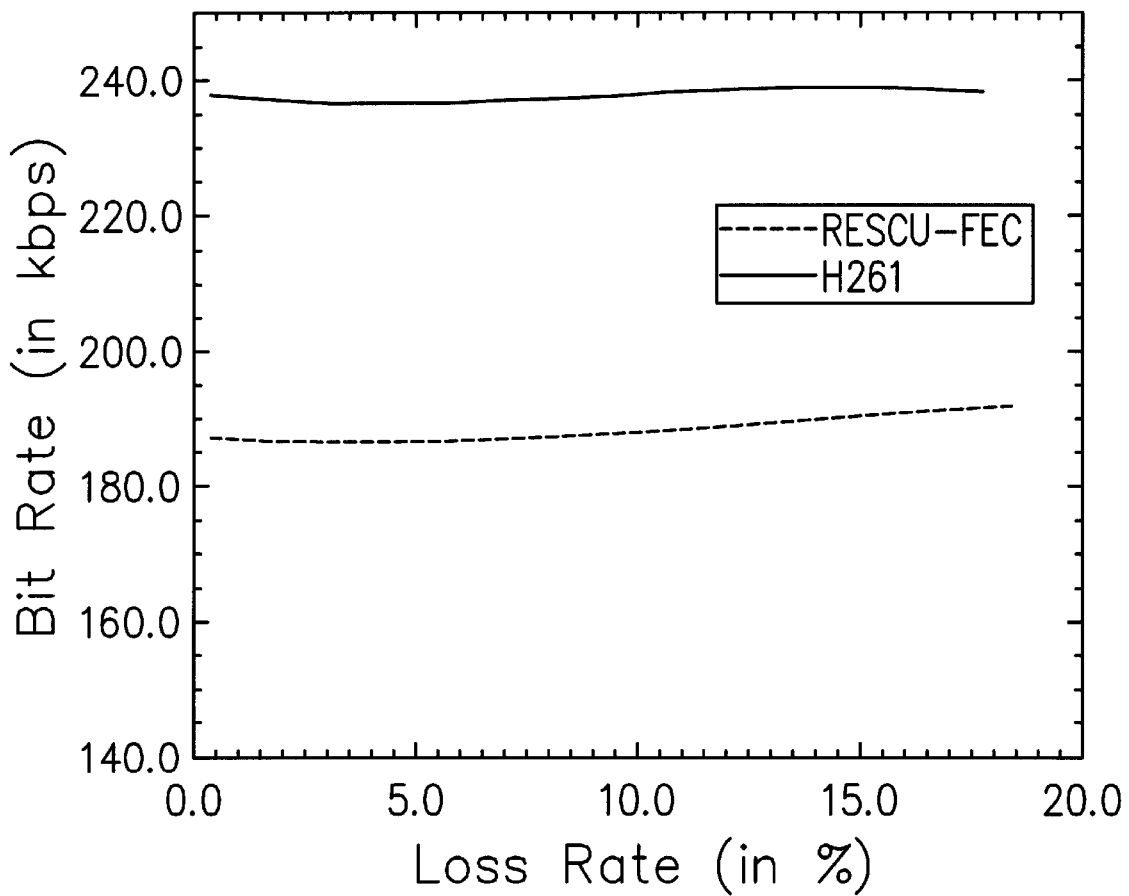
FIG. 19 is a graph illustrating the average bit rate of H.261 with an intra-frame every 5 frames.

The bandwidth overhead of H.261 over RESCU-FEC is compared in achieving comparable video quality. H.261 can improve its error resilience by transmitting intra-frames more frequently. A series of experiments were performed and it was observed that by having one I-frame every 5 frames, H.261 can give video quality similar to that of RESCU-FEC with PTDD 6. The results are presented in FIGS. 18 and 19.

For loss rates up to 5%, H.261 gives a slightly better video quality than RESCU-FEC. This is because at low loss rates, very few frames are likely to lose packets. Thus, the effect of error propagation is not so pronounced. Also, the I-frame has much better quality than other frames. Since I-frames are sent every 5 frames, we see a slight improvement in the overall video quality compared to RESCU-FEC. However, at all other loss rates, video quality sustained by RESCU-FEC is better than H.261. At high loss rates, RESCU-FEC can give about 1 dB higher PSNR than H.261. This better PSNR occurs even though H.261 uses 25 percent more bandwidth than RESCU-FEC. This is clearly shown in FIG. 18.

In H.261, distortion in a video frame propagates until the next I-frame. This is because in H.261, every frame depends on the immediately previous frame and error propagation between two I-frames could be caused by loss of packets belonging to any frame. For moderate to high loss rates, packet losses could occur in any frame and hence the deteriorating quality as a result of error propagation. In RESCU, non-periodic frames use only periodic frames as reference frames. Thus, distortion in non-periodic frames does not propagate at all. Also, FEC packets help recover the loss of packets of the periodic frame quickly and this allows some of non-periodic frames within a PTDD to be displayed without error propagation. Thus, continuous updates in a periodic frame subsequently improve the quality of non-periodic frames dependent on that periodic frame and also stop error propagation beyond the next periodic frame.

Comparison of RESCU-FEC with a Conventional FEC Scheme

In H.261, every frame temporally depends on its immediately preceding frame. Although H.261 can provide very good compression efficiency, error propagation can happen because of losses in any frame. Thus, FEC schemes integrated with H.261 have to provide protection against losses in every frame. Providing protection against losses in every frame requires original data packets and FEC packets in each frame's interval.

Experiments were performed to measure the bandwidth required to provide performance comparable to that of RESCU-FEC. Traces for these tests were obtained by mapping the actual traces as done in generating traces for RESCU-FEC. When the receiver does not receive enough FEC packets to recover the lost data packets, error propagation would start. In order to stop error propagation, the receiver asks for replenishment. The timing of this replenishment is estimated based on the average RTT seen by the corresponding actual transmission trace and an exponential distribution. The results for experiments with 4 and 6 FEC packets per frame are shown in FIGS. 20 and 21.

Figure 20:
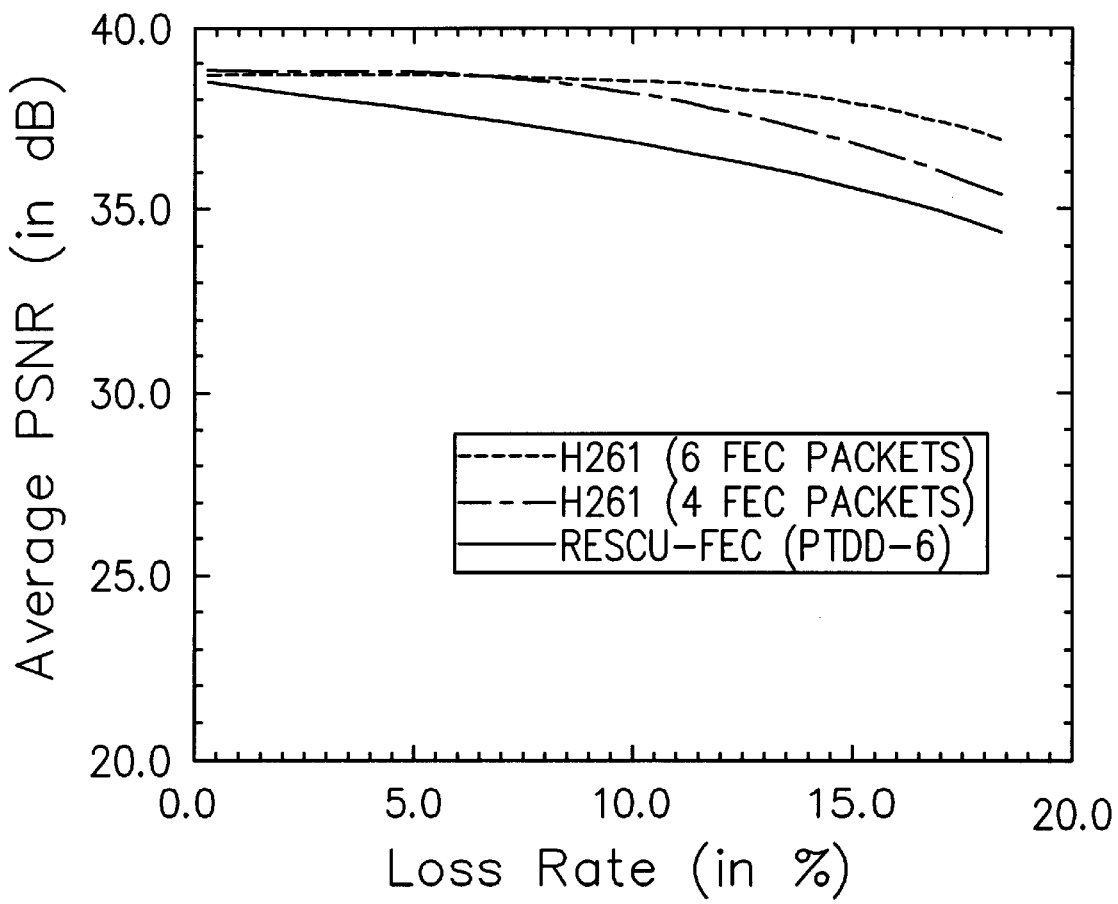
FIG. 20 is a graph illustrating the average PSNR of RESCU-FEC and conventional FEC schemes over different loss rate lengths.
Figure 21:
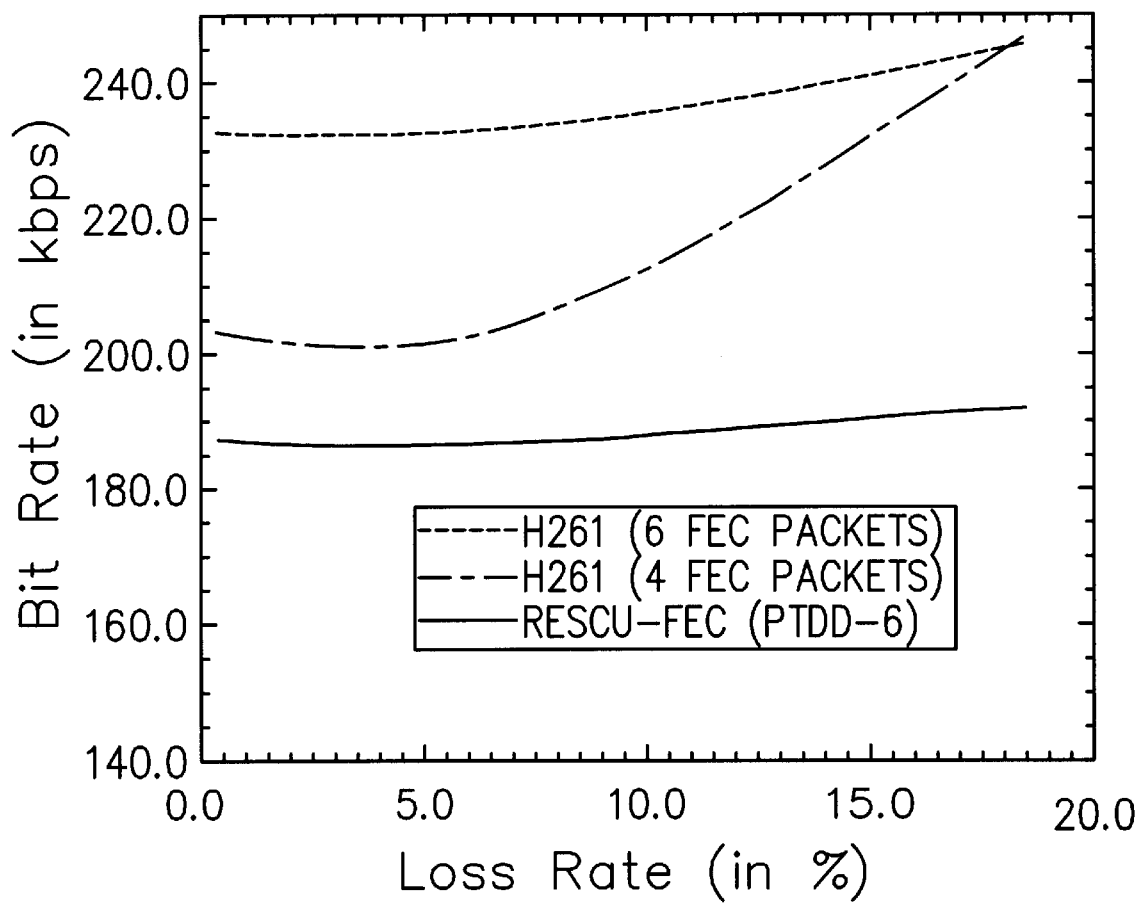
FIG. 21 is a graph illustrating the average bit rate of RESCU-FEC and convention FEC schemes over different loss rate lengths.

FIGS. 20 and 21 show that at low loss rates, 4 FEC packets are most of the time enough to recover the losses in a frame. However, at moderate to high loss rates, it is shown that often the receiver did not receive enough FEC packets to recover the frame and hence asked for replenishments. This is the reason for the increasing bandwidth. The time of arrival of the replenishment depends on the network delay and there can be error propagation between the time when the replenishment is requested and its arrival at the receiver. The effects of this error propagation on the video quality is seen at high loss rates, which are often combined with larger network delays. Video quality decreases even as the bandwidth increases because of replenishments. In contrast to the results for transmitting 4 FEC packets per frame, the bandwidth is somewhat steady when there are 6 FEC packets per frame. The reason that bandwidth is steadier is that most of the time losses in the frame are recoverable. Thus, at low loss rates, the conventional scheme with 4 FEC packets provides good video quality, and at moderate to high loss rates, 6 FEC packets are needed for adequate protection.

In RESCU-FEC, non-periodic frames are not protected at all. Thus, if non-periodic frames lose any packets, distortion will be seen in those frames. Periodic frames are recovered relatively later than in the conventional FEC, since the FEC packets are dispersed in the PTDD. This is the reason that the conventional FEC scheme gives a PSNR about 1 dB higher than RESCU-FEC. However, embedding a significant number of parity packets per frame results in a large bandwidth overhead. In H.261 based FEC schemes, this is absolutely essential since error propagation can occur because of losses in any frame. However, in the RESCU-FEC scheme, distortion in non-periodic frame does not propagate at all. Hence, reasonably good video quality can be sustained even when these frames are not protected. Longer PTDD means a somewhat reduced compression efficiency compared to H.261, but the tradeoff in FEC packets weighs in favor of RESCU-FEC. Also, in high frame rate interactive video, there is still considerable temporal redundancy between frames at a short distance away. All these factors contribute to inconsiderably lower bandwidth needed by RESCU-FEC. Moreover, in the conventional FEC scheme, if there are data losses in the frame, those packets must be reconstructed using FEC packets. Reconstruction using FEC packets may occur at almost every frame since packets are frequently lost in the Internet. Reconstruction during every frame may conflict with stringent real-time requirements of applications like video conferencing. In RESCU-FEC, the periodic frame requires reconstruction only once in the PTDD. Also, packet losses in the Internet have been known to have a bursty nature with short average burst lengths. Dispersing the FEC packets in the PTDD minimizes the chances of more than one of the FEC packets being lost in the burst and thus reduces the number of FEC packets needed to protect data packets which are likely to undergo burst losses.

Summary

The RESCU Patent Application illustrates that retransmission can be made a feasible alternative in error-recovery schemes for interactive video applications without introducing any artificial extension of frame playout times. The central idea in the RESCU Patent Application is that correcting errors in a reference frame due to packet losses can be used to prevent error spread. However, performance of retransmission-based schemes is very sensitive to network latencies.

The present invention includes a FEC technique based on the RESCU scheme. The experiments discussed herein illustrate that with little extra bandwidth, rapid recovery from errors and a good overall video quality can be achieved. The results described herein indicate that the FEC technique is very insensitive to network latencies. Under low to moderate loss rates (less than 10%), about 3 FEC packets are sufficient to recover the losses of periodic frames in most cases. However, at higher loss rates, more FEC packets are required for each periodic frame. By increasing PTDD to 6 frame distance, the same amount of total bandwidth is allocated to FEC as in PTDD of 3 frames and very good error resilience under high loss rates is achieved with the overall video quality of more than 35 dB. Bandwidth usage increases slightly as PTDD increases. The increased bandwidth was due to reduced compression efficiency associated with longer PTDD. This increased bandwidth can be controlled by increasing quantization step-size without noticeable loss in quality. However, bandwidth regulation is more of an optimization problem and is not essential to the present invention.

The results discussed above illustrate that for packet loss rates encountered in actual experiments, RESCU-FEC with PTDD of 9 frames was more than sufficient from the bandwidth perspective with only insignificant gains over the performance of RESCU-FEC with PTDD 6. The results also illustrate the bandwidth advantage of RESCU-FEC over H.261 in achieving comparable error resilience to that of RESCU-FEC. The results clearly indicate that H.261 needs more than 25% bandwidth to get the same video quality.

The main implication of the present invention is that for most of the practical situations on the current Internet, proactive techniques such as RESCU-FEC can very effectively alleviate the problem of error spread with only a small extra bandwidth. This technique also has the advantage in making minimal use of the feedback channel. Hence, this scheme has the potential to be very useful in multicast scenarios and wireless and satellite-based communications.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for transmitting video data over a lossy packet-based network, the method comprising:
   at a transmitter,
   (a) encoding a first video frame into k data packets, k being an integer;
   (b) determining n minus k (n–k) forward error correction (FEC) packets for the first video frame, n being an integer;
   (c) transmitting the k data packets over a lossy packet-based network to a receiver during a first frame interval;
   (d) transmitting the n–k FEC packets to the receiver during frame intervals after the first frame interval;
   at the receiver,
   (e) receiving some of the k data packets, decoding the received data packets to reproduce the first video frame, and displaying the first video frame with errors;
   (f) receiving the n–k FEC packets and using the n–k FEC packets to restore the first video frame; and
   (g) using the first video frame as a reference frame for decoding at least one subsequent video frame.

2. The method of claim 1 wherein transmitting the n–k FEC packets to the receiver comprises interleaving the n–k FEC packets with data packets of video frames to be displayed at the receiver after display of the first video frame.

3. The method of 1 comprising determining a time interval between the n–k FEC packets required to protect the n–k FEC packets from burst losses and wherein transmitting the n–k FEC packets to the receiver includes spacing transmission of each of the n–k FEC packets by the time interval.

4. The method of claim 3 wherein determining a time interval required to protect the n–k FEC packets from burst loss includes determining the time interval based on feedback from the receiver.

5. The method of claim 4 wherein the feedback from the receiver includes acknowledgments of previously transmitted data packets.

6. The method of claim 5 wherein the feedback from the receiver includes negative acknowledgments of indicative of lost data packets.

7. The method of claim 1 wherein transmitting the n–k FEC packets to the receiver includes encapsulating the n–k FEC packets in real time protocol (RTP) packets.

8. The method of claim 7 wherein encapsulating the n–k FEC packets in RTP packets includes adding an RTP header and a FEC header to each of the n–k FEC packets.

9. The method of claim 8 wherein each FEC header includes a field for indicating the number of data packets used to generate each FEC packet.

10. The method of claim 1 wherein the first video frame is a periodic frame and using first video frame as a reference frame for decoding at least one subsequent video frame includes using the first video frame as a reference frame for decoding a subsequent periodic frame.

11. The method of claim 10 wherein using the first video frame as a reference frame for decoding a subsequent periodic frame comprises using the first video frame as a reference frame for decoding a second periodic frame immediately following the first video frame.

12. The method of claim 11 comprising decoding the second periodic frame using the first video frame as a reference frame before display of the second periodic frame.

13. The method of claim 11 comprising decoding the second periodic frame using the first video frame as a reference frame after display of the second periodic frame.

14. The method of claim 13 comprising using the second period frame as a reference frame for decoding a third periodic frame received after the second periodic frame.

15. A method for optimized cascaded error recovery when transmitting video over a lossy packet-based network, the method comprising:
   (a) receiving, over a lossy packet-based network, a plurality of data packets associated with a first video frame $F_i$, i being an integer;
   (b) decoding the data packets to reproduce the first video frame $F_i$;
   (c) displaying the first video frame $F_i$ with errors;
   (d) after display of the first video frame $F_i$, receiving error correction packets associated with the first video frame $F_i$;
   (e) repairing the first video frame $F_i$ using the error correction packets;
   (f) receiving data packets associated with periodic frames $F_{i+n}$, n being an integer, transmitted after the first video frame $F_i$;
   (g) using motion estimation to determine the effect of errors in the first video frame $F_i$ on the subsequent periodic frames $F_{i+n}$ and
   (h) restoring the subsequent periodic frames $F_{i+n}$ using the restored first video frame $F_i$ and the motion estimation.

16. The method of claim 15 wherein receiving error correction packets includes receiving forward error correction (FEC) packets.

17. The method of claim 15 wherein receiving error correction packets includes receiving retransmitted data packets.

18. The method of claim 15 wherein restoring the periodic frames $F_{i+n}$ includes restoring a periodic frame $F_{i+2}$ using the first video frame as a reference and motion estimation without restoring a periodic frame $F_{i+1}$.

19. A computer program product comprising computer-executable instructions embodied in a computer readable medium for performing steps comprising:

at a transmitter,
  (a) encoding a first video frame into k data packets, k being an integer;
  (b) determining n minus k (n−k) forward error correction (FEC) packets for the first video frame, n being an integer;
  (c) transmitting the k data packets over a lossy packet-based network to a receiver during a first frame interval;
  (d) transmitting the n−k FEC packets to the receiver during frame intervals after the first frame interval;

at the receiver,
  (e) receiving some of the k data packets, decoding the received data packets to reproduce the first video frame and displaying the first video frame with errors;
  (f) receiving the n−k FEC packets and using the n−k FEC packets to restore the first video frame; and
  (g) using the first video frame as a reference frame for decoding at least one subsequent video frame.

20. The computer program product of claim 19 wherein transmitting the n−k FEC packets to the receiver comprises interleaving the n−k FEC packets with data packets of video frames to be displayed at the receiver after display of the first video frame.

21. The computer program product of 19 comprising determining a time interval between FEC packets required to protect the FEC packets from burst losses and wherein transmitting the n−k FEC packets to the receiver includes spacing transmission of each of the n−k FEC packets by the time interval.

22. The computer program product of claim 21 wherein determining a time interval required to protect the FEC packets from burst loss includes determining the time interval based on feedback from the receiver.

23. The computer program product of claim 22 wherein the feedback from the receiver includes acknowledgments of previously transmitted data packets.

24. The computer program product of claim 23 wherein the feedback from the receiver includes negative acknowledgments of indicative of lost data packets.

25. The computer program product of claim 19 wherein transmitting the n−k FEC packets to the receiver includes encapsulating the n−k FEC packets in real time protocol (RTP) packets.

26. The computer program product of claim 25 wherein encapsulating the FEC packets in RTP packets includes adding an RTP header and a FEC header to each of the n−k FEC packets.

27. The computer program product of claim 26 wherein each FEC header includes a field for indicating the number of data packets used to generate each FEC packet.

28. The computer program product of claim 19 wherein the first video frame is a periodic frame and using first video frame as a reference frame for decoding at least one subsequent video frame includes using the first video frame as a reference frame for decoding a subsequent periodic frame.

29. The computer program product of claim 28 wherein using the first video frame as a reference frame for decoding a subsequent periodic frame comprises using the first video frame as a reference frame for decoding a second periodic frame immediately following the first video frame.

30. The computer program product of claim 29 comprising decoding the second periodic frame using the first video frame as a reference frame before display of the second periodic frame.

31. The computer program product of claim 29 comprising decoding the second periodic frame using the first video frame as a reference frame after display of the second periodic frame.

32. The computer program product of claim 31 comprising using the second period frame as a reference frame for decoding a third periodic frame received after the second periodic frame.

33. A computer program product comprising computer-executable instructions embodied in a computer readable medium for performing steps comprising:
  (a) receiving, over a lossy packet-based network, a plurality of data packets associated with a first video frame $F_i$, i being an integer;
  (b) decoding the data packets to reproduce the first video frame $F_i$;
  (c) displaying the first video frame $F_i$ with errors;
  (d) after display of the first video frame $F_i$, receiving error correction packets associated with the first video frame $F_i$;
  (e) repairing the first video frame $F_i$ using the error correction packets;
  (f) receiving data packets associated with periodic frames $F_{i+n}$, n being an integer, transmitted after the first video frame $F_i$;
  (g) using motion estimation to determine the effect of errors in the first video frame $F_i$ on the subsequent periodic frames $F_{i+n}$ and
  (h) restoring the subsequent periodic frames $F_{i+n}$ using the restored first video frame $F_i$ and the motion estimation.

34. The computer program product of claim 33 wherein receiving error correction packets includes receiving forward error correction (FEC) packets.

35. The computer program product of claim 33 wherein receiving error correction packets includes receiving retransmitted data packets.

36. The computer program product of claim 33 wherein restoring the periodic frames $F_{i+n}$ includes restoring a periodic frame $F_{i+2}$ using the first video frame as a reference and motion estimation without restoring a periodic frame $F_{i+1}$.

* * * * *